(12) United States Patent
Inagaki

(10) Patent No.: US 9,872,113 B2
(45) Date of Patent: Jan. 16, 2018

(54) MEASUREMENT DEVICE AND MEASUREMENT SYSTEM

(71) Applicant: KYOCERA CORPORATION, Kyoto (JP)

(72) Inventor: Tomohiro Inagaki, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/899,362

(22) PCT Filed: Jun. 24, 2014

(86) PCT No.: PCT/JP2014/003391
§ 371 (c)(1),
(2) Date: Dec. 17, 2015

(87) PCT Pub. No.: WO2014/208085
PCT Pub. Date: Dec. 31, 2014

(65) Prior Publication Data
US 2016/0150328 A1    May 26, 2016

(30) Foreign Application Priority Data

Jun. 26, 2013 (JP) ................................. 2013-134286
Jul. 23, 2013 (JP) ................................. 2013-152607

(51) Int. Cl.
*H04R 25/00* (2006.01)
*H04M 1/24* (2006.01)
(Continued)

(52) U.S. Cl.
CPC .............. *H04R 25/30* (2013.01); *H04M 1/24* (2013.01); *H04R 17/00* (2013.01); *H04R 25/608* (2013.01);
(Continued)

(58) Field of Classification Search
CPC .............. H04R 2460/13; H04R 25/606; A61N 1/36032; H04M 1/72591
(Continued)

(56) References Cited

U.S. PATENT DOCUMENTS

| 3,876,035 A | 4/1975 | Eckel |
| 4,586,194 A | 4/1986 | Kohashi et al. |

(Continued)

FOREIGN PATENT DOCUMENTS

| JP | S58-198338 A | 11/1983 |
| JP | 59-165598 | 9/1984 |

(Continued)

OTHER PUBLICATIONS

Standard: IEC/TS 60318-7 http://standards.globalspec.com/std/1302710/iec-ts-60318-7 Feb. 1, 2011.*
(Continued)

*Primary Examiner* — George Monikang
(74) *Attorney, Agent, or Firm* — Studebaker & Brackett PC

(57) ABSTRACT

A measurement device (10) for evaluating an electronic device (100) that causes sound to be heard via vibration transmission by pressing a vibrating body against a human ear includes an ear model (50) modeled after a human ear and vibration pickups (57a) and (57b) disposed at a periphery of an artificial external ear canal (53) formed in the ear model (50).

13 Claims, 26 Drawing Sheets

(51) Int. Cl.
*H04R 17/00* (2006.01)
*H04M 1/725* (2006.01)

(52) U.S. Cl.
CPC ..... *H04M 1/72591* (2013.01); *H04R 2460/13* (2013.01)

(58) Field of Classification Search
USPC .............................. 381/380–381, 328, 330
See application file for complete search history.

(56) References Cited

U.S. PATENT DOCUMENTS

| | | | |
|---|---|---|---|
| 5,624,377 A | 4/1997 | Davis | |
| 5,856,722 A * | 1/1999 | Haronian | G01H 3/08 310/309 |
| 8,520,866 B2 * | 8/2013 | Linjama | G06F 3/016 381/151 |
| 2008/0159571 A1 * | 7/2008 | Hooley | H04R 1/403 381/307 |
| 2010/0092001 A1 | 4/2010 | Saltykov et al. | |
| 2010/0239107 A1 * | 9/2010 | Fujita | H04H 60/04 381/119 |
| 2011/0100127 A1 * | 5/2011 | Beck | A61B 5/121 73/585 |
| 2011/0280425 A1 * | 11/2011 | Gibbons | H04R 1/1016 381/328 |
| 2011/0319021 A1 * | 12/2011 | Proulx | H04R 17/02 455/41.2 |
| 2013/0034253 A1 * | 2/2013 | Nakayama | H04S 3/002 381/302 |

FOREIGN PATENT DOCUMENTS

| | | |
|---|---|---|
| JP | 11-500284 | 1/1999 |
| JP | H11-41683 A | 2/1999 |
| JP | 2005-348193 A | 12/2005 |
| JP | 2010-261886 A | 11/2010 |
| WO | 2007/134403 A1 | 11/2007 |

OTHER PUBLICATIONS

International Search Report, PCT/JP2014/003391 dated Sep. 30, 2014.
Written Opinion of the International Searching Authority with Concise Explanation, PCT/JP2014/003391, dated Sep. 30, 2014.
Extended European Search Report (EESR) dated Feb. 21, 2017 from corresponding EP Appl No. 14816840.4, 10 pp.

* cited by examiner

FIG. 9
(a)
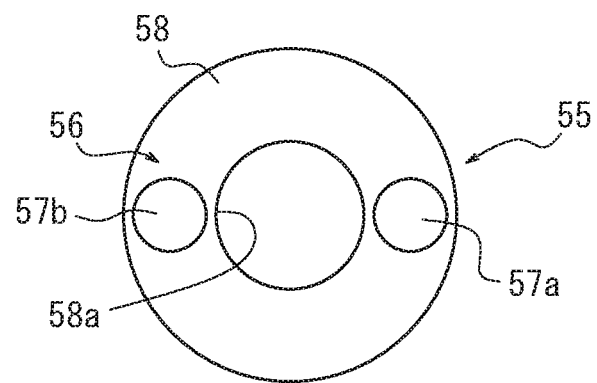
(b)
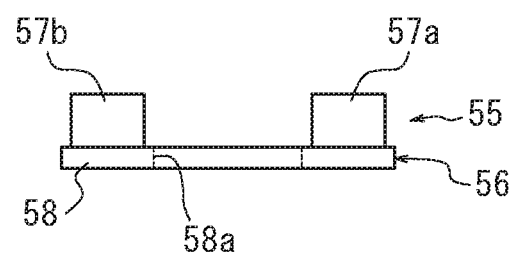

FIG. 10
(a)
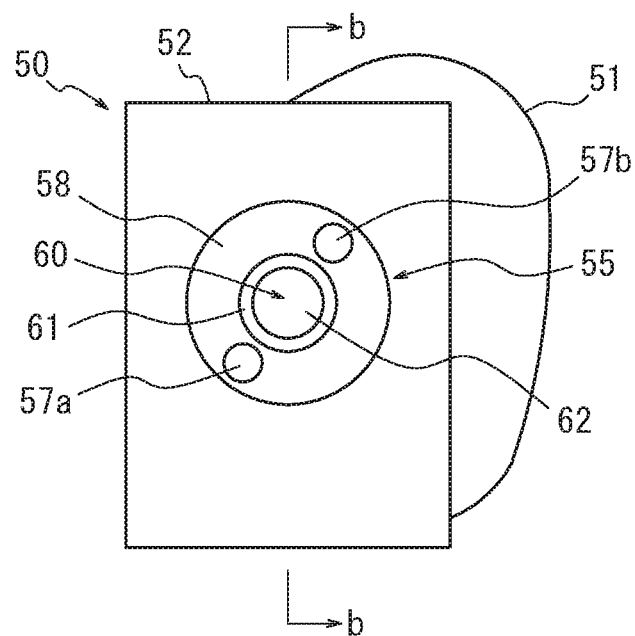
(b)
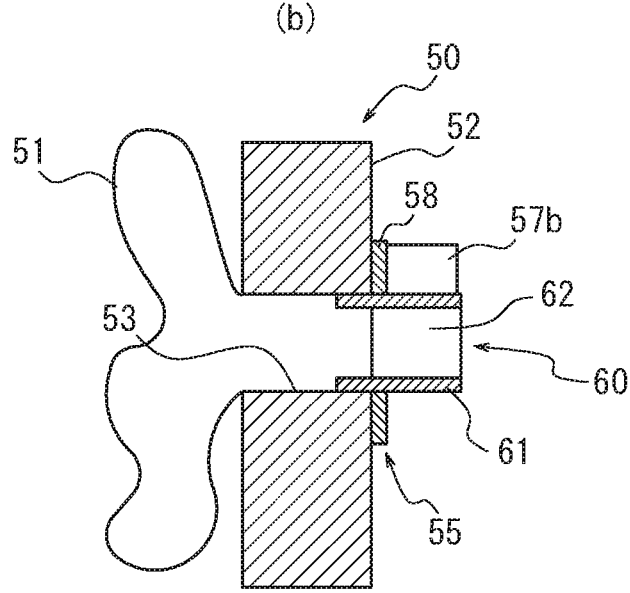

FIG. 18
(a)
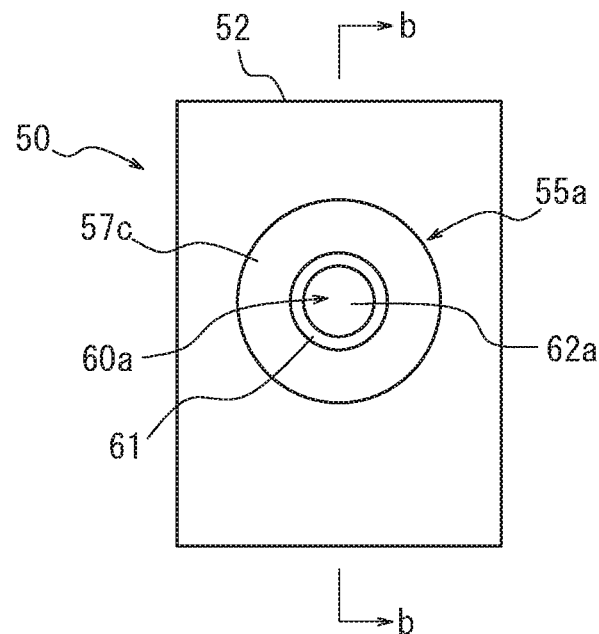
(b)
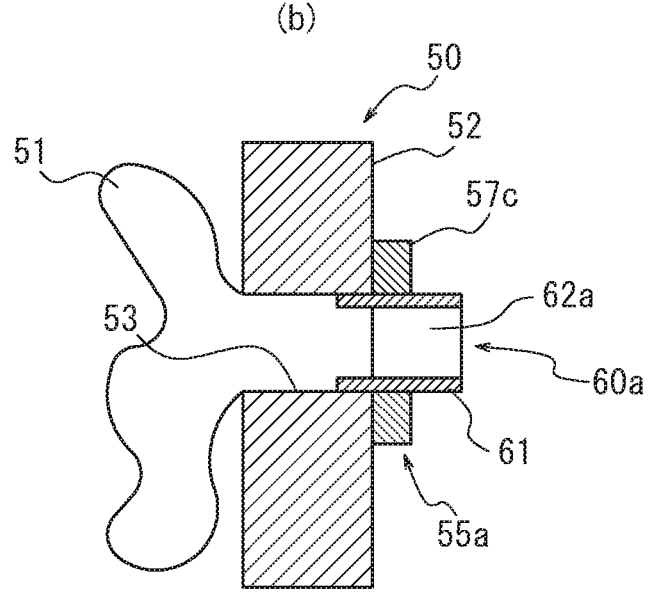

FIG. 19
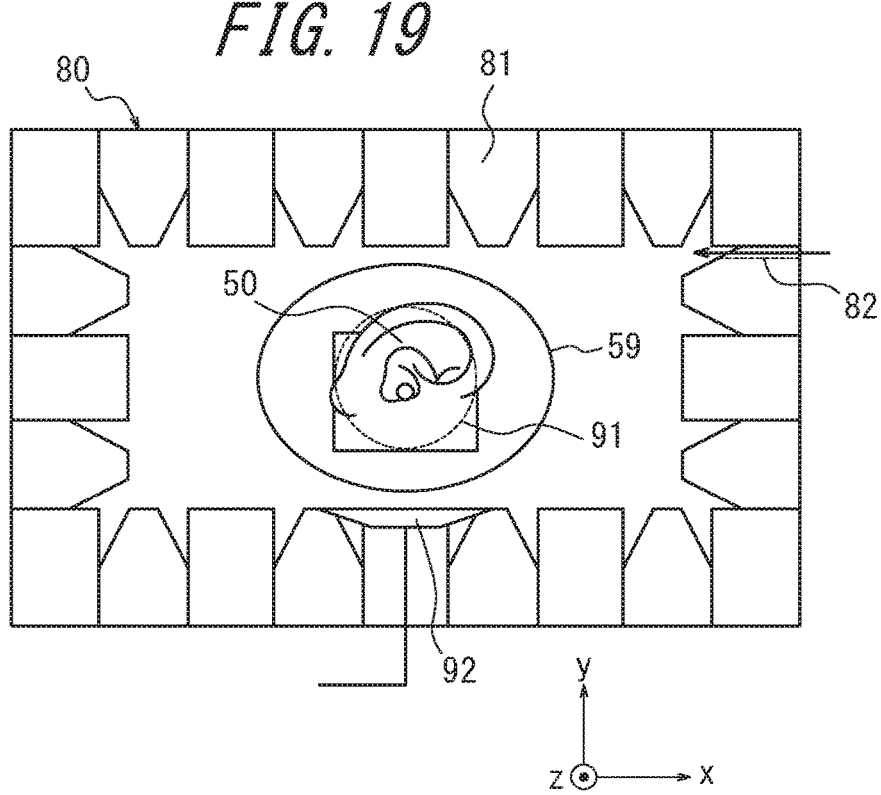
(a)
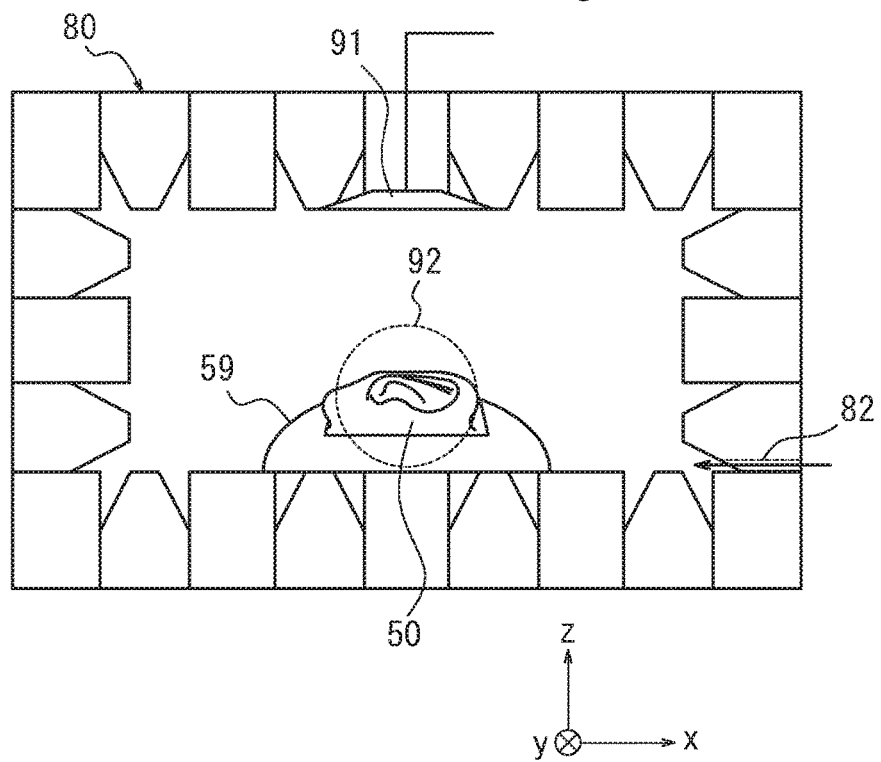
(b)

FIG. 21
(a)
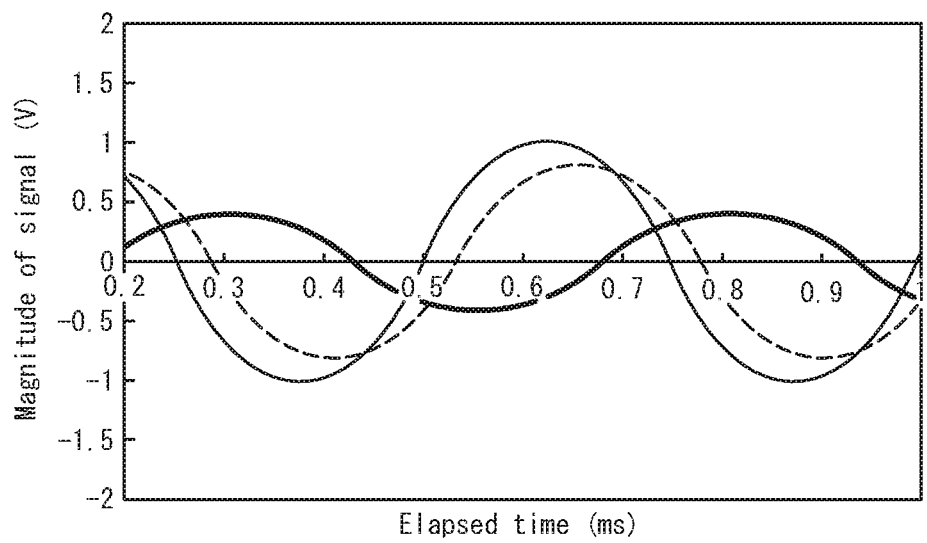
(b)
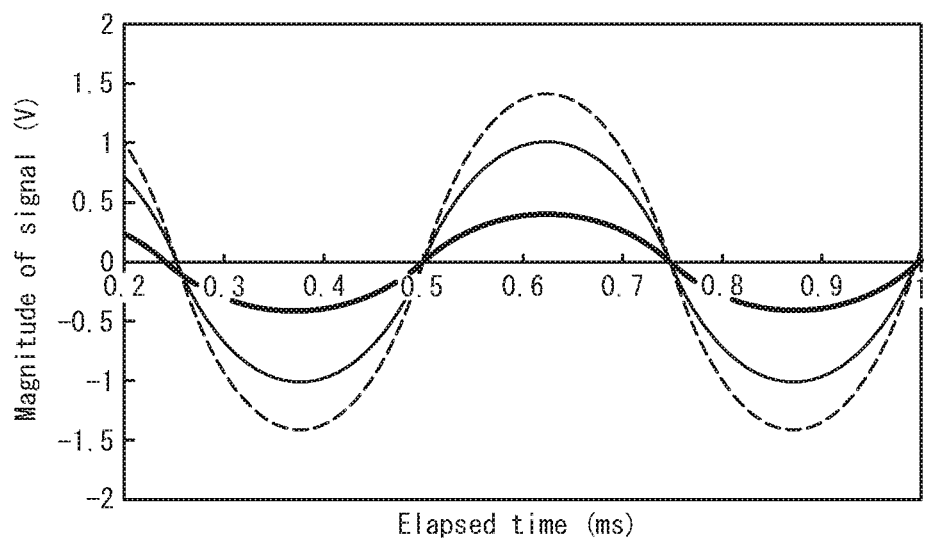

FIG. 26
(a)
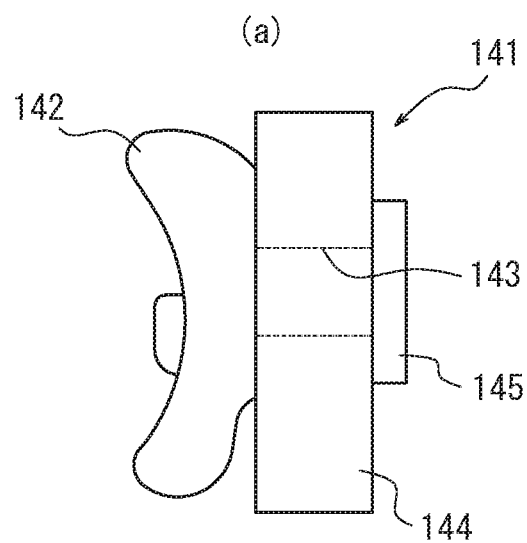
(b)
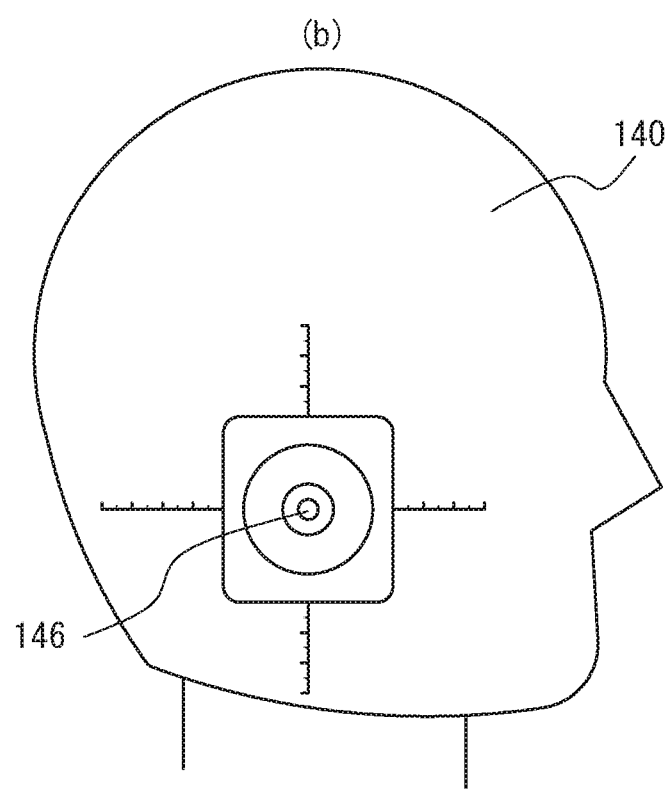

MEASUREMENT DEVICE AND MEASUREMENT SYSTEM

CROSS-REFERENCE TO RELATED APPLICATIONS

This application claims priority to and the benefit of Japanese Patent Application No. 2013-134286 filed Jun. 26, 2013, and Japanese Patent Application No. 2013-152607 filed Jul. 23, 2013, the entire contents of which are incorporated herein by reference.

TECHNICAL FIELD

This disclosure relates to a measurement device and a measurement system for evaluating and measuring an acoustic device, such as an electronic device or a hearing aid, that is configured to transmit sound to a user based on vibration of a vibrating body, held in a housing, by pressing the vibrating body against a human ear.

BACKGROUND

JP 2005-348193 A (PTL 1) discloses an electronic device, such as a mobile phone or the like, that transmits air-conducted sound and bone-conducted sound to a user. As the air-conducted sound, PTL 1 discloses a sound that is transmitted to the user's auditory nerve by air vibrations, caused by a vibrating object, that are transmitted through the external ear canal to the eardrum and cause the eardrum to vibrate. As the bone-conducted sound, PTL 1 discloses a sound that is transmitted to the user's auditory nerve through a portion of the user's body (such as the cartilage of the outer ear) that is contacting a vibrating object.

In the telephone disclosed in PTL 1, a rectangular plate-shaped vibrating body, formed from a piezoelectric bimorph and a flexible substance, is attached to an outer surface of a housing via an elastic member. PTL 1 also discloses that when voltage is applied to the piezoelectric bimorph in the vibrating body, the piezoelectric material expands and contracts in the longitudinal direction, causing the vibrating body to undergo bending vibration, and air-conducted sound and bone-conducted sound are transmitted to the user when the user touches the vibrating body to the auricle.

CITATION LIST

Patent Literature

PTL 1: JP 2005-348193 A

SUMMARY

Technical Problem

As disclosed in PTL 1, in order to evaluate an electronic device that transmits bone-conducted sound through cartilage of the outer ear and air-conducted sound to a user, the sound pressure and the amount of vibration acting on a human auditory nerve due to vibration of a vibrating body need to be measured by approximation. The following two methods of measurement are methods for measuring the amount of vibration.

The first method of measurement is to measure the amount of vibration as voltage by pressing the vibrating body targeted for measurement against an artificial mastoid, for bone-conducted vibrating element measurement, that mechanically simulates the mastoid process behind the ear. The second method of measurement is to measure the amount of vibration as voltage by pressing a vibration pickup, such as a piezoelectric acceleration pickup, against the vibrating body targeted for measurement.

The measured voltage obtained with the first method of measurement, however, is a voltage mechanically weighted for characteristics of a human body when the vibrating body is pressed against the mastoid process behind a human ear. This is not a voltage weighted for characteristics of vibration transmission when the vibrating body is pressed against a human ear. Furthermore, the measured voltage obtained with the second method of measurement measures the amount of vibration of the vibrating body directly. Similarly, this is not a voltage weighted for characteristics of vibration transmission in a human ear. Therefore, an electronic device that transmits bone-conducted sound through cartilage of the outer ear and air-conducted sound to a user cannot be properly evaluated by measuring the amount of vibration of the vibrating body with the above methods of measurement.

I have developed an acoustic device, such as a hearing aid, that differs from the telephone disclosed in PTL 1 by transmitting sound using air-conducted sound generated by having a vibrating body vibrate a vibration transmission member disposed in the acoustic device, vibration sound (bone-conducted sound) that is a sound component due to vibration transmission occurring when the vibrating vibration transmission member is contacted to a human auricle, and the like.

No method of measurement, however, has been established whatsoever for the above-described acoustic device that transmits sound to a user by contacting a vibrating body to a human auricle. Therefore, the air-conducted radiation component occurring in the external ear canal of the ear due to vibration and the vibration component transmitted via cartilage of the ear cannot be measured. Similarly, no existing system can measure the measurement items specified by standards for ordinary hearing aids or the like.

It would therefore be helpful to provide a measurement device that can measure an amount of vibration weighted for the characteristics of vibration transmission in a human ear and that can properly evaluate an electronic device that includes a vibrating body.

It would also be helpful to provide a measurement system that can measure the characteristics of an acoustic device that transmits sound to a user by contacting a vibrating body to a human auricle.

Solution to Problem

A measurement device disclosed herein is a measurement device for evaluating an electronic device that causes sound to be heard via vibration transmission by pressing a vibrating body against a human ear, the measurement device including: an ear model modeled after a human ear; and a plurality of vibration pickups disposed at a periphery of an artificial external ear canal formed in the ear model.

A measurement system disclosed herein is a measurement system for evaluating an acoustic device including a microphone that collects sound and a vibrating body that is pressed against an ear of a user and transmits sound collected by the microphone to the user, the measurement system including: a speaker; an ear model modeled after a human ear; a vibration sound detector disposed in the ear model; and an anechoic space housing the speaker, the ear model, and the vibration sound detector.

Advantageous Effect

The disclosed measurement device can measure the amount of vibration weighted for characteristics of vibration transmission in a human ear and can properly evaluate an electronic device that includes a vibrating body.

The disclosed measurement system can measure the characteristics of an acoustic device that transmits sound to a user by contacting a vibrating body to a human auricle.

BRIEF DESCRIPTION OF THE DRAWINGS

In the accompanying drawings:

FIGS. 9A and 9B illustrate the structure of a vibration detector in FIG. 8;

FIGS. 10A and 10B illustrate the structure of the vibration measurement head in FIG. 8;

FIGS. 18A and 18B are detailed partial diagrams of the ear model in FIG. 16;

FIGS. 19A and 19B illustrate the detailed structure of the inside of an anechoic space in the measurement system;

FIGS. 21A and 21B illustrate the phase relationship between output of the vibration detection element and output of the microphone in FIG. 20;

FIGS. 26A and 26B are detailed partial diagrams of the measurement system in FIG. 25.

DETAILED DESCRIPTION

First, before describing the disclosed embodiments, an electronic device that can be measured by the disclosed measurement device is described.

All electronic devices that cause sound to be heard through vibration transmission by pressing a vibrating body against a human ear are electronic devices that can be measured. Such electronic devices include not only audio communication devices such as the telephone disclosed in PTL 1, but also well-known bone-conduction type hearing aids and other auditory auxiliary devices, earphones, and the like. The electronic devices below are also provided as examples of targets for measurement.

Figure 1:
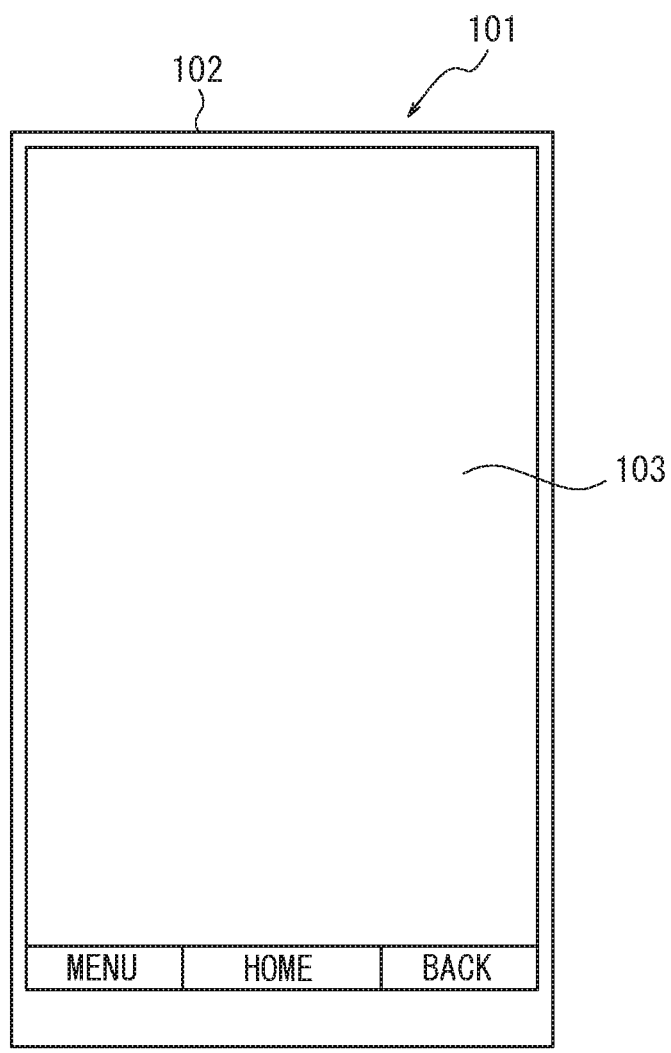
FIG. 1 illustrates an example of a mobile phone as an electronic device that can be measured by the disclosed measurement device.

The electronic device in FIG. 1 is a mobile phone 101, such as a smartphone, that the applicant has proposed and includes a rectangular panel 103 that is larger than a human ear on the surface of a rectangular housing 102. This mobile phone 101 vibrates the panel 103 as a vibrating body and transmits sound to a user through vibration transmission by pressing the panel 103 against the user's ear so as to cover the ear.

Figure 2:
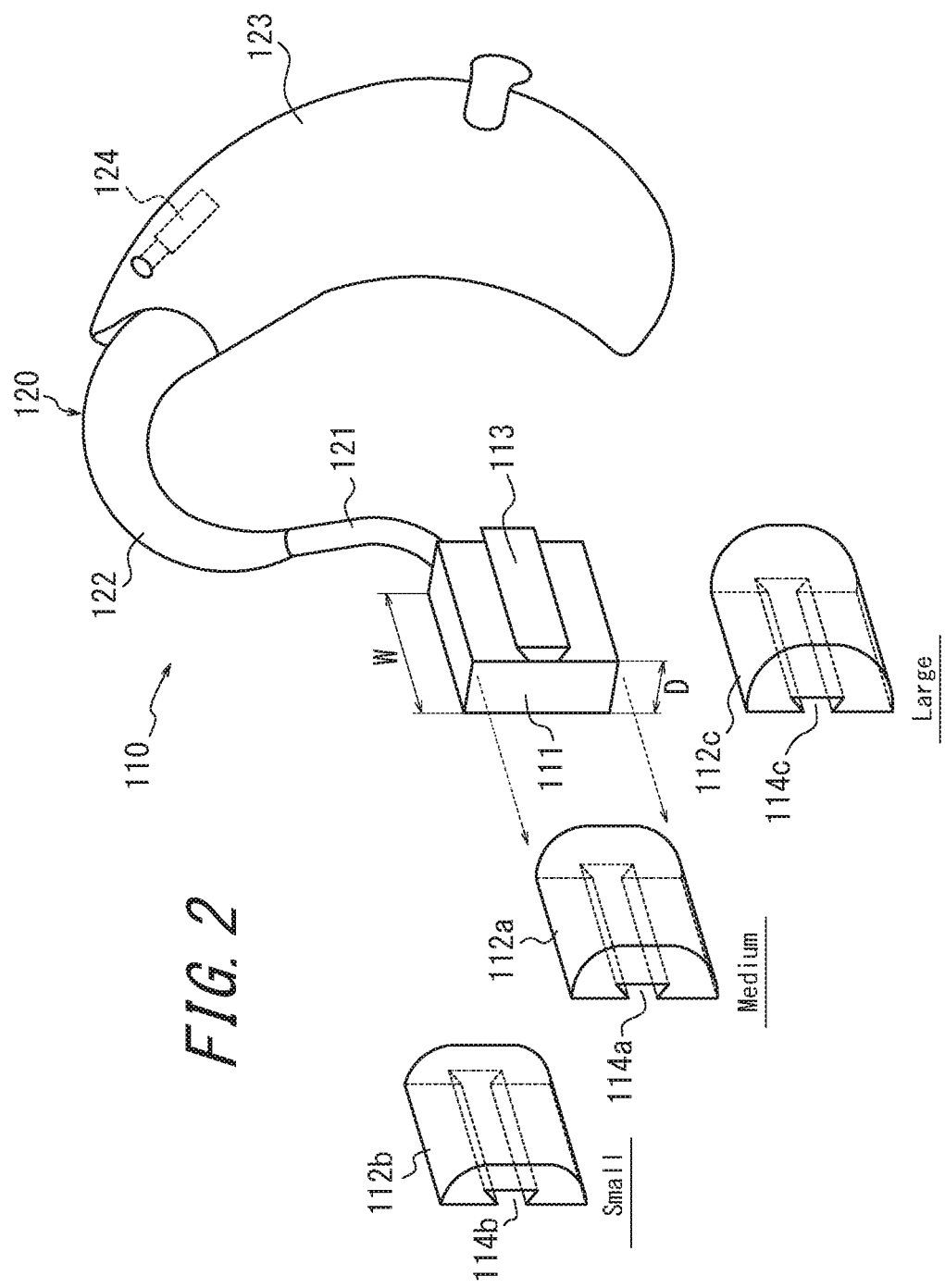
FIG. 2 illustrates an example of a hearing aid as an electronic device that can be measured by the disclosed measurement device.

The electronic device in FIG. 2 is a hearing aid 110 that I have proposed and includes a vibrating body 111. The vibrating body 111 includes a pressing member 112a and an attaching portion 113. The pressing member 112a is attached to the vibrating body 111. For example when the vibrating body 111 contacts the user's tragus, then by the pressing member 112a being contacted to a portion of the external ear canal opposite the tragus, for example a location near the antitragus, the pressing member 112a presses the vibrating body 111 against the tragus. The position where the vibrating body 111 contacts the user's ear may, for example, be the tragus, antitragus, concha auriculae, or auricle. Here, an example is described in which the position of contact with the user's ear is the tragus (the inner wall of the external ear canal by the tragus).

The attaching portion 113 is a member for attaching the pressing member 112a to the vibrating body 111. The pressing member 112a and the attaching portion 113 are shaped to fit together. The pressing member 112a preferably includes a concave cutout portion 114a, and the attaching portion 113 preferably has a convex shape that fits into the cutout portion 114a. The pressing member 112a can be detached from the vibrating body 111 by sliding in the width direction. The vibrating body 111 preferably has a thickness (D) of 4 mm or less and a width (W) of 15 mm or less. If the size is within this range, the vibrating body 111 can fit within the external ear canal of the user's ear regardless of gender or age (except for toddlers and below). The pressing member 112a preferably comes in three sizes (small, medium, and large), with one of the pressing members 112a, 112b, and 112c being selected in accordance with the size of the user's ear and attached to the attaching portion 113 for the pressing member.

A holder 120 includes a support 121, an ear hook 122, and a body 123. The holder 120 holds the vibrating body 111 at the position at which the vibrating body 111 contacts the user's ear (the inner wall of the external ear canal by the tragus). One end of the support 121 is connected to the vibrating body 111. The support 121 has a hollow structure, and a lead wire is fed to the vibrating body 111 through this hollow structure. The support 121 is rigid enough so that the angle of the vibrating body 111 does not change. The other end of the support 121 is connected to one end of the ear hook 122.

The ear hook 122 contacts the outside of the user's auricle to mount the hearing aid 110 in the user's ear. The ear hook 122 is preferably shaped as a hook conforming to the user's auricle so as to mount the hearing aid 110 stably in the user's ear. The other end of the ear hook 122 is connected to the body 123. A microphone 124, volume and sound quality adjustment interface, controller, and the like are stored in the body 123.

Figure 3:
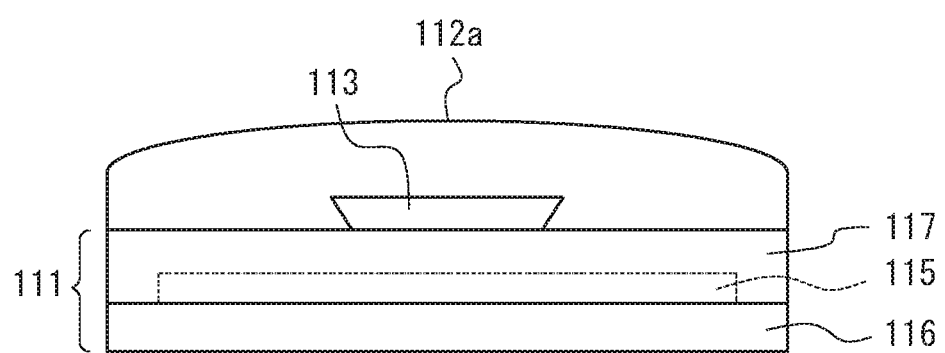
FIG. 3 is a side view of the vibrating body in the hearing aid of FIG. 2.

FIG. 3 is a side view of the vibrating body 111. The vibrating body 111 includes a piezoelectric element 115 and a panel 116. The piezoelectric element 115 is formed by elements that, upon application of an electric signal (voltage), either expand and contract or bend (flex) in accordance with the electromechanical coupling coefficient of their constituent material. Ceramic or crystal elements, for example, may be used. The piezoelectric element 115 may be configured as a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage). The surface of the piezoelectric element 115 that contacts the panel 116 (principal surface) is preferably shaped as a plate with a width of 4.0 mm and a length of 17.5 mm.

The piezoelectric element 115 is joined to the panel 116 by a joining member. The panel 116 is, for example, made from glass or a synthetic resin such as acrylic or the like. The panel 116 is preferably shaped as a plate. The joining member is disposed between the principal surface of the piezoelectric element 115 and the principal surface of the panel 116. For example, a non-heat hardening adhesive material or double-sided tape is used as the joining member. Apart from the surface joined to the panel 116, the piezoelectric element 115 is covered by a mold 117. The pressing member 112*a* and the attaching portion 113 for the pressing member are provided at the top of the mold 117.

The surface of the panel 116 that contacts the ear (principal surface) preferably has an area between 0.8 and 10 times the area of the principal surface of the piezoelectric element 115. If the principal surface of the panel 116 has an area between 0.8 and 10 times the area of the principal surface of the piezoelectric element 115, the panel 116 can deform in conjunction with expansion and contraction or bending of the piezoelectric element 115, and the area of contact with the user's ear can be sufficiently guaranteed. The area of the principal surface of the panel 116 is, for example, more preferably between 0.8 and 5 times the area of the principal surface of the piezoelectric element 115. Accordingly, the principal surface of the panel 116 for example has a width of 10 mm and a length of 18 mm.

Figure 4:
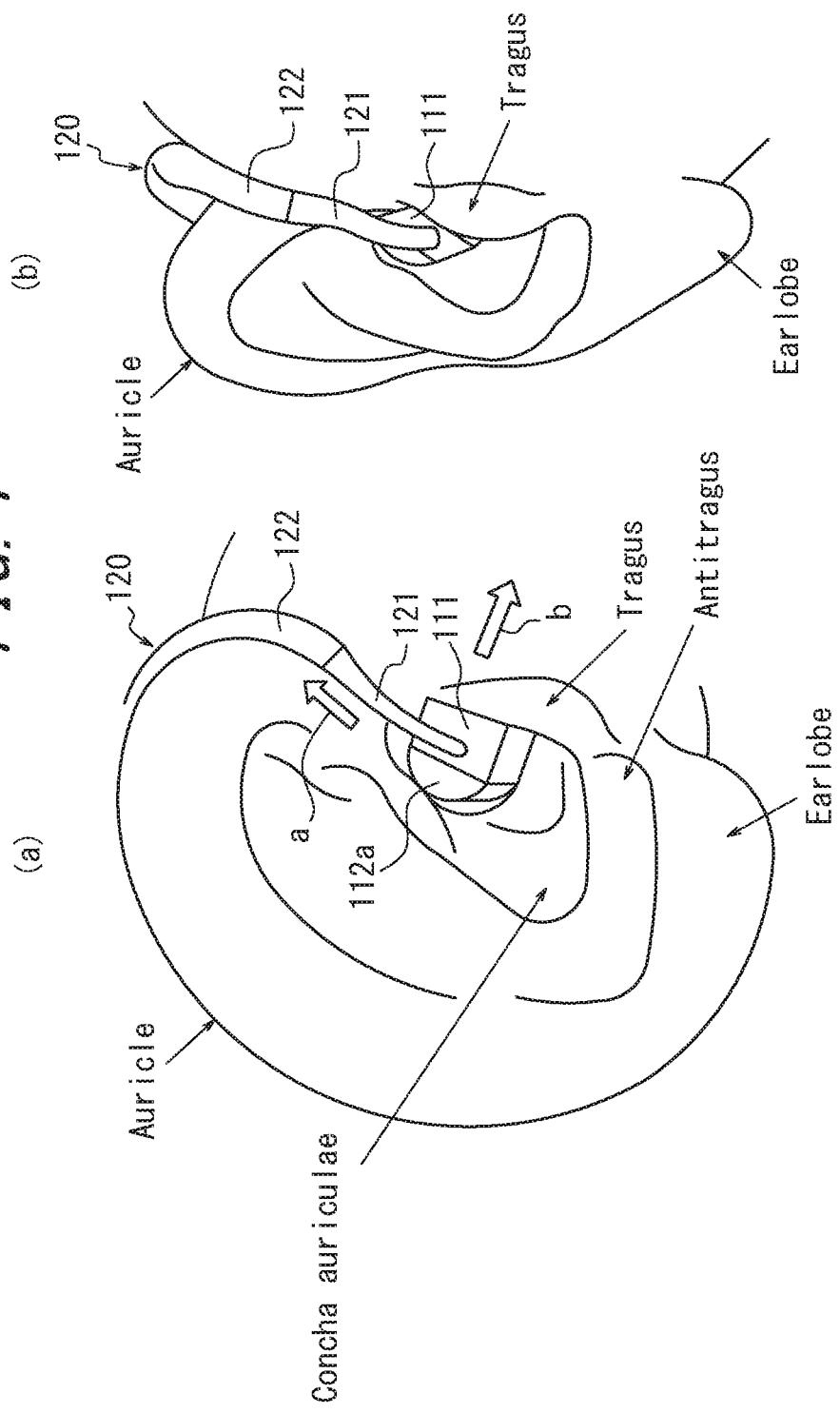
FIGS. 4A and 4B illustrate the hearing aid of FIG. 2 as worn in a user's ear.

FIGS. 4A and 4B illustrate the hearing aid 110 as worn in a user's ear. FIG. 4A is a front view of the ear, and FIG. 4B is a side view of the ear from the face. The hearing aid 110 causes the user to hear sound by contacting the vibrating body 111 to the user's tragus or antitragus from inside the user's ear and transmitting vibration to the tragus or the antitragus. Stating that the vibrating body 111 is "contacted to the user's tragus or antitragus from inside the user's ear" refers to how, when buried in the external ear canal of the ear, the vibrating body 111 is contacted to the tragus or antitragus from a position near the entrance of the external ear canal. In the example in FIGS. 4A and 4B, the vibrating body 111 is contacted to the user's tragus from inside the user's ear. At this time, the pressing member 112*a* contacts a portion of the external ear canal opposite the tragus.

The vibrating body 111 illustrated in FIG. 4A is pulled via the support 121 in the direction of the arrow a by the weight of the holder 120, i.e. by the weight of the body 123 connected to the end of the ear hook 122. As illustrated in FIG. 4B, since the vibrating body 111 contacts the tragus so as to be caught by the tragus, a force acts on the vibrating body 111 in the direction of contact with the user's ear (the direction of the arrow b) when the vibrating body 111 is pulled in the direction of the arrow a. In other words, by the weight of the holder 120, a force (pressing force) is produced in the direction in which the vibrating body 110 is contacted to the user's ear. The holder 120 thus causes a pressing force to act on the vibrating body 111, thereby more reliably transmitting sound by vibration of the vibrating body 111.

The vibrating body 111 is preferably pressed against the user's ear with a force of 0.1 N to 3 N. If the vibrating body 111 is pressed with a force between 0.1 N and 3 N, vibration by the vibrating body 111 is sufficiently transmitted to the ear. Furthermore, if the pressure is a small force of less than 3 N, the user suffers little fatigue even when wearing the hearing aid 110 for an extended period of time, thus maintaining a sense of comfort when wearing the hearing aid 110.

As illustrated in FIG. 4A, the above-described hearing aid 110 does not completely seal the external ear canal with the vibrating body 111 and the pressing member 112*a*. Therefore, the hearing aid 110 does not cause an occlusion effect and remains comfortable when worn.

Figure 5:
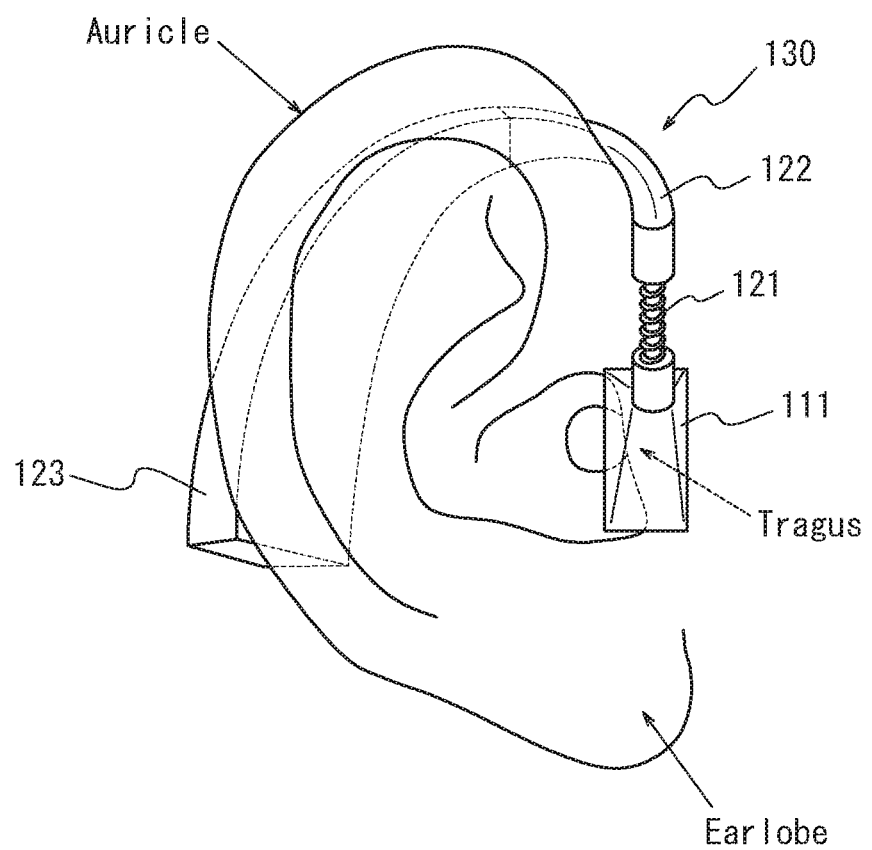
FIG. 5 illustrates another example of a hearing aid as an electronic device that can be measured by the disclosed measurement device.
Figure 6:
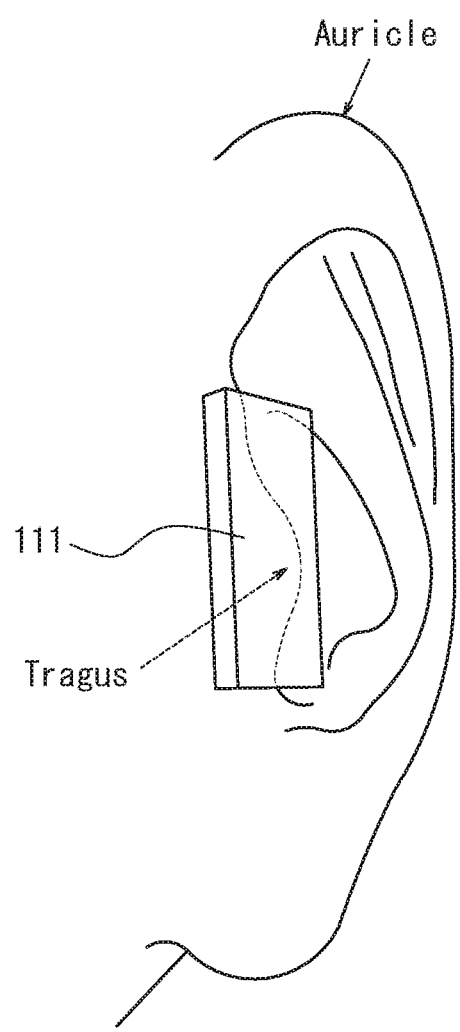
FIG. 6 illustrates the portion of the hearing aid in FIG. 5 that contacts the tragus.

The electronic device in FIG. 5 is a hearing aid 130 similar to the one in FIG. 2 that I have proposed. The same structural components as those illustrated in FIG. 2 are assigned the same reference signs, and a description thereof is omitted. The hearing aid 130 is used by contacting the vibrating body 111 to the user's ear from outside of the ear, for example by contacting the vibrating body 111 to the tragus. Therefore, as illustrated in FIG. 2, a holder 120 is provided. From a different angle, FIG. 6 illustrates the vibrating body 111 in contact with the tragus. As illustrated in FIG. 6, the vibrating body 111 is contacted to the protruding tragus, and therefore by providing the below-described concavity 131 at the position of contact with the tragus, the area of contact between the vibrating body 111 and the tragus can be sufficiently ensured without crushing the tragus.

As illustrated in FIGS. 2 and 5, the holder 120 includes a support 121, an ear hook 122, and a body 123. The holder 120 holds the vibrating body 111 at the position at which the vibrating body 111 contacts the user's ear (tragus). One end of the support 121 is connected to the vibrating body 111. The support 121 has a hollow structure, and a lead wire is fed to the vibrating body 111 through this hollow structure. The support 121 is rigid enough so that the angle of the vibrating body 111 does not change. The other end of the support 121 is connected to one end of the ear hook 122.

The ear hook 122 contacts the outside of the user's auricle to mount the hearing aid 130 in the user's ear. The ear hook 122 is preferably shaped as a hook conforming to the user's auricle so as to mount the hearing aid 130 stably in the user's ear. The other end of the ear hook 122 is connected to the body 123. A microphone, volume and sound quality adjustment interface, controller, and the like are stored in the body 123.

Figure 7:
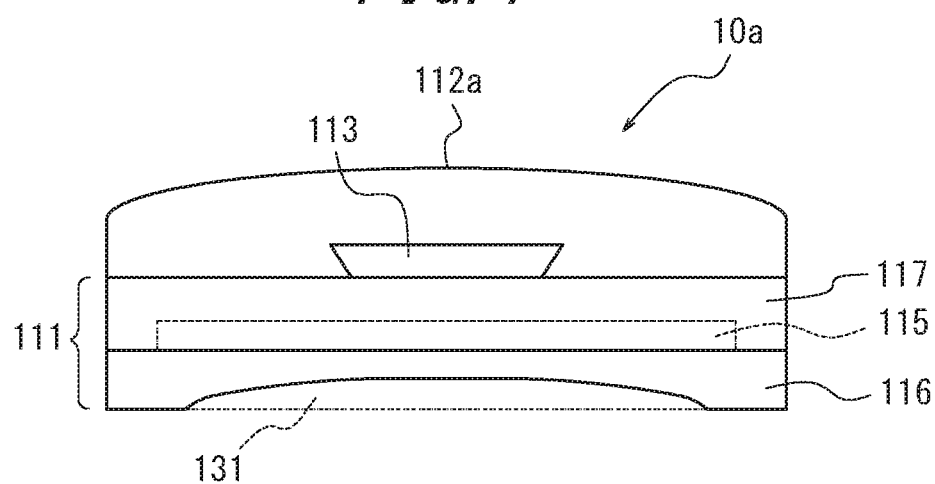
FIG. 7 is a side view of the vibrating body in the hearing aid of FIG. 5.

FIG. 7 is a side view of the vibrating body 111. As described above, the vibrating body 111 includes the piezoelectric element 115 and the panel 116. The piezoelectric element 115 is preferably shaped as a plate, as in FIG. 7.

The piezoelectric element 115 is joined to the panel 116 by a joining member. The joining member is disposed between the principal surface of the piezoelectric element 115 and the principal surface of the panel 116. A non-heat hardening adhesive material or double-sided tape is used as the joining member. Apart from the surface joined to the panel 116, the piezoelectric element 115 is covered by a mold 117.

The principle surface of the panel 116 includes the concavity 131. The concavity 131 is a recessed portion in the central region of the panel 116. Since the tragus projects outward, it is necessary to secure the area of contact by crushing the tragus when contacting a flat surface to the tragus. Since the hearing aid 130 in FIG. 5 includes the concavity 131, however, and this concavity 131 is contacted to the tragus, the area of contact can be secured without crushing the tragus. Since it is not necessary to crush the tragus, the holder 120 can have a simple structure. Furthermore, since the tragus is not crushed, a sense of comfort can be maintained when the user wears the hearing aid 1.

The panel 116 of the vibrating body 111 is pressed against the user's ear with a force of 0.1 N to 3 N. If the panel 116 is pressed with a force between 0.1 N and 3 N, vibration by the panel 116 is sufficiently transmitted to the ear. If the pressure is a small force of less than 3 N, the user suffers little fatigue even when wearing the hearing aid 130 for an extended period of time, thus maintaining a sense of comfort when wearing the hearing aid 130.

The concavity 131 of the panel 116 preferably includes a portion that contacts the user's ear (for example, the tragus) and a portion that does not contact the user's ear. By providing a portion that does not contact the user's ear within the panel 116, generation of air-conducted sound may be allowed from this portion.

The principal surface of the panel 116 preferably has an area between 0.8 and 10 times the area of the principal surface of the piezoelectric element 115. If the principal surface of the panel 116 has an area between 0.8 and 10 times the area of the principal surface of the piezoelectric element 115, the panel 116 can deform in conjunction with expansion and contraction or bending of the piezoelectric element 115, and the area of contact with the user's ear can be sufficiently guaranteed. The area of the principal surface of the panel 116 is, for example, more preferably between 0.8 and 5 times the area of the principal surface of the piezoelectric element 115.

Apart from the hearing aids illustrated in FIGS. 2 and 5, an electronic device having a protrusion or corner that transmits vibration to only a portion of a human ear may also be targeted for measurement.

The following describes the disclosed measurement device with reference to the drawings.

Embodiment 1

Figure 8:
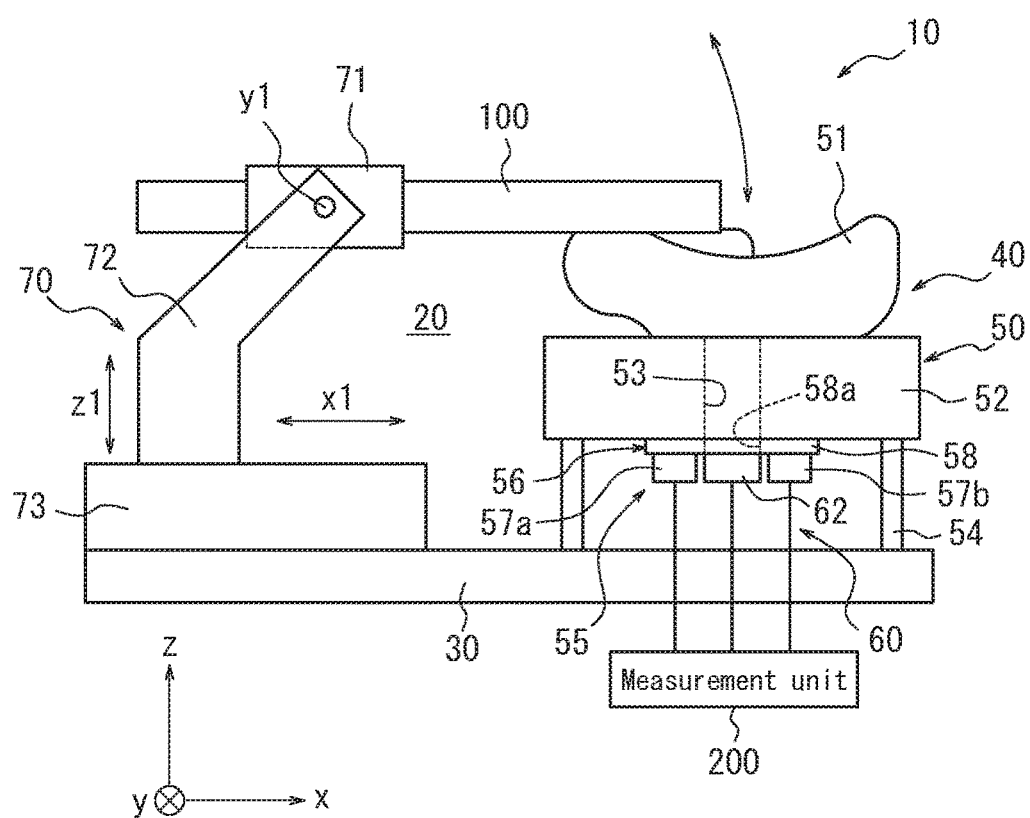
FIG. 8 schematically illustrates the structure of a measurement device according to Embodiment 1.

FIG. 8 schematically illustrates the structure of a measurement device according to Embodiment 1. The measurement device 10 of this embodiment includes an electronic device mount 20 and a measurement unit 200. In the measurement device 10, the electronic device mount 20 and the measurement unit 200 may be formed integrally, or the electronic device mount 20 and the measurement unit 200 may be separate and appropriately connected to form a measurement system. The electronic device mount 20 is provided with a vibration measurement head 40, supported by a base 30, and a holder 70 that holds the electronic device 100 targeted for measurement. As the electronic device 100, the holder 70 detachably holds the telephone disclosed in PTL 1, the mobile phone 101 of FIG. 1, or the like. First, the vibration measurement head 40 is described.

The vibration measurement head 40 is provided with an ear model 50 and a vibration detector 55. The ear model 50 is modeled after a human ear and includes an artificial ear 51 and an artificial external ear canal unit 52 joined to the artificial ear 51. The ear model 50 in FIG. 8 corresponds to the right ear of a human. An artificial external ear canal 53 is formed in the central region of the artificial external ear canal unit 52. The artificial external ear canal 53 is formed with a hole diameter of 5 mm to 18 mm. This diameter is preferably 7 mm to 8 mm, which is the average diameter of the human external acoustic pore. The ear model 50 is detachably supported on the base 30 via a support member 54 at the periphery of the artificial external ear canal unit 52.

The ear model 50 is made from similar material to the material of an average artificial ear used in, for example, a manikin such as a Head And Torso Simulator (HATS), Knowles Electronic Manikin for Acoustic Research (KEMAR), or the like, such as material conforming to IEC 60318-7. This material may, for example, be formed with a material such as rubber having a hardness of 35 to 55. The hardness of rubber may, for example, be measured in conformity with International Rubber Hardness Degrees (IRHD/M) conforming to JIS K 6253, ISO 48, or the like. As a hardness measurement device, a fully automatic IRHD/M micro-size international rubber hardness gauge GS680 by Teclock Corporation may suitably be used. Considering the variation in ear hardness due to age, as a rule of thumb, approximately two or three types of the ear model 50 with a different hardness are preferably prepared and used interchangeably. The ear model 50 may also be prepared based on statistical data for the ear hardness of Asians, Caucasians, Blacks, or people of other races.

The thickness of the artificial external ear canal unit 52, i.e. the length of the artificial external ear canal 53, corresponds to the length up to the human eardrum (cochlea) and for example is suitably set in a range of 5 mm to 50 mm, preferably 8 mm to 30 mm. In this embodiment, the length of the artificial external ear canal 53 is approximately 30 mm. Thus providing the artificial external ear canal 53 is preferable, since the air-conducted sound emitted from the inner wall of a human external ear canal can be reproduced.

As illustrated by the plan view in FIG. 9A and the front view in FIG. 9B, the vibration detector 55 includes a vibration transmitter 56 and a plurality of (in this case, two) vibration pickups 57a and 57b. The vibration transmitter 56 includes a plate-shaped vibration transmission member 58 that has a hole 58a with a diameter that is approximately the same as the hole diameter of the artificial external ear canal 53, for example a diameter of 8 mm.

The vibration transmission member 58 is formed from material with good vibration transmission efficiency. For example, a metal or an alloy, such as steel, SUS, brass, aluminum or titanium, or plastic or the like may be used, yet in terms of detection sensitivity, a lightweight material is preferable. The vibration transmission member 58 may be rectangular, such as a square washer, but a ring shape such as a round washer is preferable, since the amount of displacement of the ear model 50 is large at the peripheral portion of the artificial external ear canal 53. The ring shape may, for example, be formed to a size of 6 mm to 12 mm greater than the diameter of the hole 58a, i.e. the ring on either side in the radial direction of the hole 58a may be approximately 5 mm. The thickness of the vibration transmission member 58 is set appropriately in accordance with material strength or the like.

The vibration pickups 57a and 57b preferably have flat output characteristics in the measurement frequency range of the electronic device targeted for measurement (for example, from 0.1 kHz to 30 kHz), are lightweight, and can accurately measure even slight vibrations. An example of such a vibration pickup is a piezoelectric acceleration pickup, such as the vibration pickup PV-08A by Rion Corporation or the like. The vibration pickups 57a and 57b are joined to the vibration transmission member 58 via a joining member, such as grease, an instant adhesive such as Aron Alpha®, or the like at on one surface of the vibration transmission member 58, preferably at symmetrical positions with respect to the hole 58a of the vibration transmission member 58.

FIG. 10A is a plan view of the vibration measurement head 40 from the base 30 side. FIG. 10B is a cross-section along the b-b line in FIG. 10A. The face of the vibration transmission member 58 at the opposite side from the face to which the vibration pickups 57a and 57b are joined is attached to the end face of the artificial external ear canal unit 52 opposite from the artificial ear 51, so that the hole 58a is in communication with the artificial external ear canal 53. The vibration transmission member 58 is preferably joined to the artificial external ear canal unit 52 so that one vibration pickup 57a is disposed at a position corresponding to the tragus of the artificial ear 51 and the other vibration pickup 57b is disposed at a position corresponding to the opposite side, with the artificial external ear canal 53 therebetween. The vibration pickups 57a and 57b are connected to the measurement unit 200.

The vibration measurement head 40 includes a sound pressure gauge 60 for measuring the sound pressure of sound propagating through the artificial external ear canal 53. The sound pressure gauge 60 measures the sound pressure produced when the vibrating body of the electronic device targeted for measurement is pressed against a human ear. This sound pressure includes sound pressure corresponding to an air-conducted component that is heard directly through the eardrum by air vibrating due to vibration of the vibrating body and sound pressure corresponding to an air-conducted component representing sound, heard through the eardrum, that is produced in the ear itself by the inside of the external ear canal vibrating due to vibration of the vibrating body. As illustrated in FIGS. 10A and 10B, the sound pressure gauge 60 includes a tube member 61, which extends from the outer wall (peripheral wall of the hole) of the artificial external ear canal 53 through the hole 58a of the vibration transmission member 58 in the vibration detector 55, and a microphone 62 held by the tube member 61.

The microphone 62 is, for example, configured using a measurement capacitor microphone that has a low self-noise level and that has flat output characteristics in the measurement frequency range of the electronic device. The capacitor microphone UC-53A produced by Rion Corporation may, for example, be used as the microphone 62. The microphone 62 is disposed so that the sound pressure detection face nearly matches the end face of the artificial external ear canal unit 52. The microphone 62 may, for example, be supported by the artificial external ear canal unit 52 or the base 30 and disposed in a floating state with respect to the outer wall of the artificial external ear canal 53. The microphone 62 is connected to the measurement unit 200. While the artificial external ear canal unit 52 is rectangular in FIG. 10A, the artificial external ear canal unit 52 may be any shape.

Next, the holder 70 in FIG. 8 is described. If the electronic device 100 targeted for measurement is a mobile phone having a rectangular shape in plan view, such as the smartphone in FIG. 1, then when people hold the mobile phone in one hand and press the mobile phone against their ear, both sides of the mobile phone are normally supported by the hand. The pressing force and contact position of the mobile phone against the ear differ for each person (user) and also vary during use. The holder 70 holds the electronic device 100 taking into consideration such a form of using the mobile phone.

The holder 70 is provided with a support 71 that supports both sides of the electronic device 100. The support 71 is attached to one end of an arm 72 so as to be rotatable about an axis y1, which is parallel to the y-axis, in a direction to press the electronic device 100 against the ear model 50. The other end of the arm 72 is joined to a movement adjuster 73 provided on the base 30. The movement adjuster 73 can adjust movement of the arm 72 in a vertical direction x1 of the electronic device 100 supported by the support 71, the direction x1 being parallel to the x-axis that is orthogonal to the y-axis, and in a direction z1 that presses the electronic device 100 against the ear model 50, the direction z1 being parallel to the z-axis that is orthogonal to the y-axis and the x-axis.

In this way, in the electronic device 100 supported by the support 71, the pressing force, against the ear model 50, of the vibrating body (panel 102) is adjusted by rotating the support 71 about the axis y1 or by moving the arm 72 in the z1 direction. In this embodiment, the pressing force is adjusted in a range of 0 N to 10 N, preferably a range of 3 N to 8 N.

The reason for the range from 0 N to 10 N is to allow measurement over a range that is sufficiently wider than the pressing force that is envisioned when a human presses the electronic device against an ear, for example to converse. The case of 0 N may, for example, include not only the case of contacting without pressing against the ear model 50, but also the case of holding the electronic device 100 at a distance from the ear model 50 in increments of 1 mm to 1 cm and measuring at each distance. This approach also allows measurement with the microphone 62 of the degree of the damping of air-conducted sound due to distance, thus making the measurement device more convenient. The range of 3 N to 8 N is assumed to be the range of the average force with which a person with normal hearing presses an ordinary speaker against an ear to converse. Differences may exist by race or gender, yet what matters is that in an electronic device such as an ordinary mobile phone, a smartphone equipped with an ordinary speaker, or the like, it is preferable to be able to measure the vibration sound and air-conducted sound for the pressing force that a user regularly applies.

By adjusting movement of the arm 72 in the x1 direction, the contact position of the electronic device 100, which is supported by the support 71, with respect to the ear model 50 is adjusted so that, for example, the panel 102 that is an example of the vibrating body covers nearly the entire ear model 50, or so that the panel 102 covers a portion of the ear model 50, as illustrated in FIG. 1. The holder 70 may also be configured to allow adjustment of the electronic device 100 to a variety of contact positions with respect to the ear model 50 by making movement of the arm 72 adjustable in a direction parallel to the y-axis, or by making the arm 72 rotatable about an axis parallel to the x-axis or the z-axis.

When the target of measurement is an electronic device that transmits vibration to only a portion of a human ear, as illustrated in FIGS. 2 and 5, the target of measurement is not held by the holder 70, but rather is held directly by the ear model 50. In this case, the vibration measurement head 40 is preferably held by the base 30 so that the ear model 50 is in the same position as when a person is standing.

Figure 11:
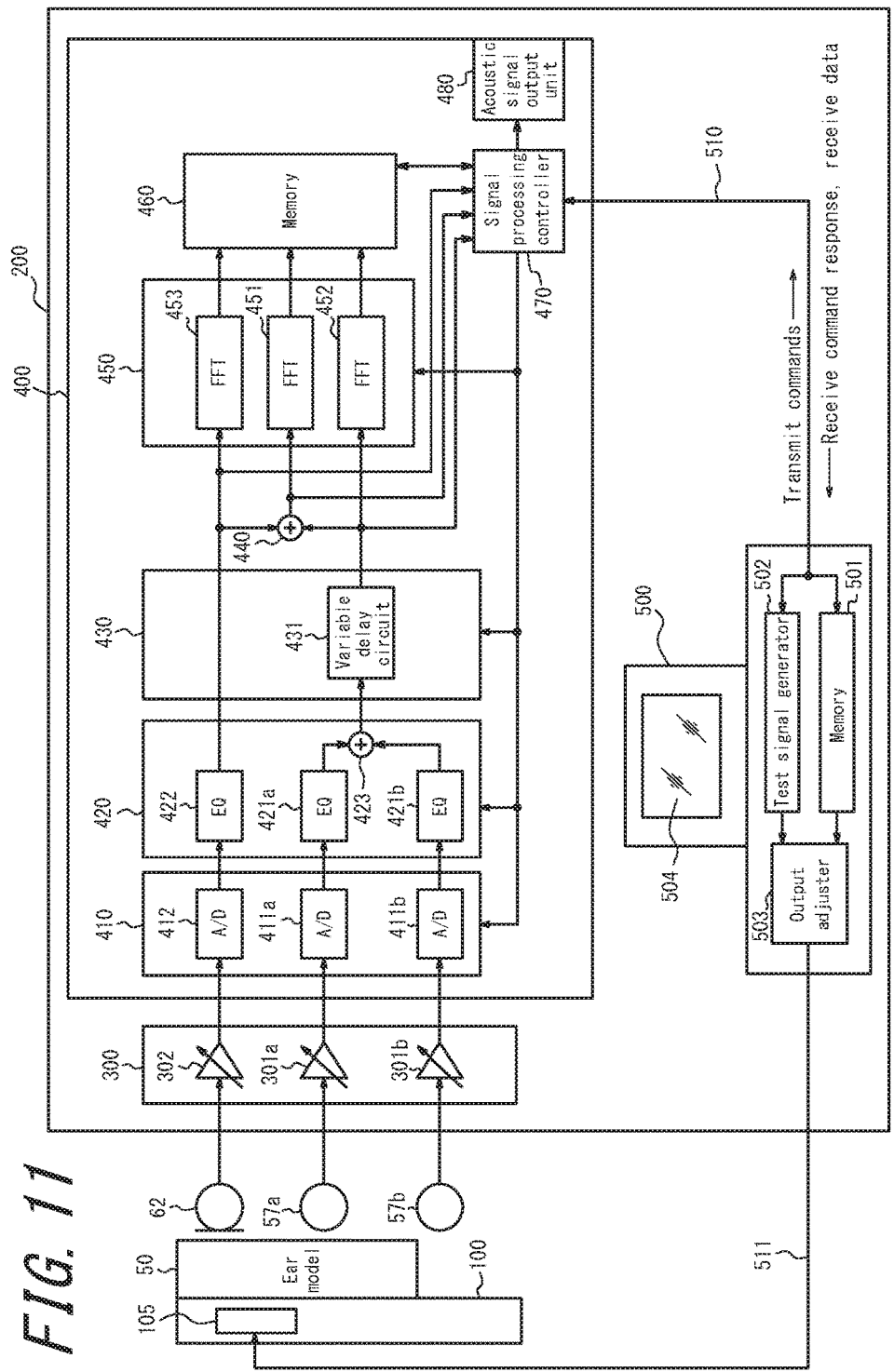
FIG. 11 is a block diagram illustrating the functional structure of a section of the measurement device in FIG. 8.

Next, the measurement unit 200 in FIG. 8 is described. FIG. 11 is a block diagram illustrating the functional structure of a section of the measurement device 10 according to this embodiment. The measurement unit 200 includes a sensitivity adjuster 300, a signal processor 400, and a personal computer (PC) 500.

Output of the vibration pickups 57a and 57b and the microphone 62 is provided to the sensitivity adjuster 300. The sensitivity adjuster 300 includes variable gain amplifier circuits 301a and 301b that respectively adjust the amplitude of the output of the vibration pickups 57a and 57b and a variable gain amplifier circuit 302 that adjusts the amplitude of the output of the microphone 62. The variable gain amplifier circuits 301a, 301b, and 302 independently adjust the amplitude of analog input signals, corresponding to the respective circuits, to a required amplitude either manually or automatically. Error in the sensitivity of the vibration pickups 57a and 57b and the sensitivity of the microphone 62 is thus corrected. The variable gain amplifier circuits 301a, 301b, and 302 are configured to allow adjustment of the amplitude of the input signals over a range of, for example, ±50 dB.

Output of the sensitivity adjuster 300 is provided to the signal processor 400. The signal processor 400 includes an A/D converter 410, frequency characteristic adjuster 420, phase adjuster 430, output combiner 440, frequency analyzer 450, memory 460, acoustic signal output unit 480, and signal processing controller 470. The A/D converter 410 includes A/D conversion circuits (A/D) 411a and 411b that convert the output of each of the variable gain amplifier circuits 301a and 301b into digital signals and an A/D conversion circuit (A/D) 412 that converts the output of the variable gain amplifier circuit 302 into a digital signal. The A/D conversion circuits 411a, 411b, and 412 can preferably support, for example, 16 bits or more, which is 96 dB or more by dynamic range conversion.

Output of the A/D converter 410 is provided to the frequency characteristic adjuster 420. The frequency characteristic adjuster 420 includes equalizers (EQ) 421a and 421b that respectively adjust the frequency characteristics of the detection signals from the vibration pickups 57a and 57b, i.e. the output of the A/D conversion circuits 411a and 411b; an equalizer (EQ) 422 that adjusts the frequency characteristics of the detection signal from the microphone 62, i.e. the output of the A/D conversion circuit 412; and a combining circuit 423 that is a vibration output combiner that combines the output of the equalizers 421a and 421b. The equalizers 421a, 421b, and 422 independently adjust the frequency characteristics of the respective input signals to frequency characteristics near the auditory sensation of the human body either manually or automatically. The equalizers 421a, 421b, and 422 may, for example, be configured with a graphical equalizer having a plurality of bands, a low pass filter, a high pass filter, or the like. The order in which the A/D converter 410 and the frequency characteristic adjuster 420 are disposed may be reversed.

Output of the frequency characteristic adjuster 420 is provided to the phase adjuster 430. The phase adjuster 430 includes a variable delay circuit 431 that adjusts the phase of the combined detection signal from the vibration pickups 57a and 57b, i.e. the output of the combining circuit 423. Since the speed of sound transmitted through the material of the ear model 50 is not exactly the same as the speed of sound transmitted through human muscle or bone, it is assumed that the phase relationship between the combined output of the vibration pickups 57a and 57b and the output of the microphone 62 will be shifted from that of a human ear, the shift being greater at high frequencies.

If the phase relationship between the combined output of the vibration pickups 57a and 57b and the output of the microphone 62 thus shifts greatly, then upon combining the two outputs with the below-described output combiner 440, amplitude peaks and dips may appear at different times than in actuality, and the combined output may be amplified or diminished. Therefore, in this embodiment, in accordance with the measurement frequency range of the electronic device 100 targeted for measurement, the phase of the combined detection signal from the vibration pickups 57a and 57b, which is the output of the combining circuit 423, is made adjustable over a predetermined range by the variable delay circuit 431.

For example, in the case of the measurement frequency range being from 100 Hz to 10 kHz, the phase of the detection signal from the vibration pickup 57 is adjusted by the variable delay circuit 431 over a range of approximately ±10 ms (corresponding to ±100 Hz) at least in increments smaller than 0.1 ms (corresponding to 10 kHz), such as increments of 0.04 μs. In the case of a human ear as well, a phase shift occurs between bone-conducted sound (vibration transmission component) and air-conducted sound (air-conducted component). Therefore, phase adjustment by the variable delay circuit 431 is not for matching the phase of the detection signals from both the vibration pickups 57a, 57b and the microphone 62, but rather for matching the phase of these detection signals to the actual auditory sensation by the ear.

Output of the phase adjuster 430 is provided to the output combiner 440 and the signal processing controller 470. The output combiner 440 combines the combined detection signal from the vibration pickups 57a and 57b, after phase adjustment by the variable delay circuit 431, with the detection signal, from the microphone 62, that has passed through the phase adjuster 430. This allows approximation of the human body in obtaining sensory sound pressure that combines the amount of vibration and the sound pressure, i.e. the vibration transmission component and air-conducted component, transmitted by vibration of the electronic device 100 targeted for measurement.

The combined output of the output combiner 440 is provided to the frequency analyzer 450 and the signal processing controller 470. The frequency analyzer 450 includes a Fast Fourier Transform (FFT) 451 that performs frequency analysis on the combined output of the output combiner 440. In this way, power spectrum data corresponding to the sensory sound pressure, in which the vibration transmission component and the air-conducted component are combined, are obtained from the FFT 451.

Furthermore, the frequency analyzer 450 is provided with FFTs 452 and 453 that respectively perform frequency analysis on the signals before combination by the output combiner 440, i.e. on the combined detection signal, from the vibration pickups 57a and 57b, that has passed through the phase adjuster 430 and the detection signal from the microphone 62. In this way, power spectrum data corresponding to the vibration transmission component are obtained from the FFT 452, and power spectrum data corresponding to the air-conducted component are obtained from the FFT 453.

In the FFTs 451 to 453, analysis points are set for the frequency component (power spectrum) in correspondence with the measurement frequency range of the electronic device 100. For example, when the measurement frequency range of the electronic device 100 is 100 Hz to 10 kHz, analysis points are set so as to analyze the frequency component at each point when dividing the interval in a logarithmic graph of the measurement frequency range into 100 to 2000 equal portions.

The output of the FFTs 451 to 453 is stored in the memory 460. The memory 460 has the capacity of at least a double buffer that can store a plurality of analysis data sets (power spectrum data) for each of the FFTs 451 to 453. The memory 460 is configured always to allow transmission of the latest data upon a data transmission request from the below-described PC 500. If analysis in real time is not required, a double buffer structure need not be adopted.

The acoustic signal output unit 480 is configured so that an externally connected device, such as headphones, can be connected detachably. Via the signal processing controller 470, the combined detection signal from the vibration pickups 57a and 57b input into the output combiner 440, the detection signal from the microphone 62, or the combination by the output combiner 440 of these detection signals is selected and provided to the acoustic signal output unit 480. After appropriately adjusting the frequency characteristics of the input data with an equalizer or the like, the acoustic signal output unit 480 performs D/A conversion to an analog acoustic signal and outputs the result.

The signal processing controller 470 is connected to the PC 500 via a connection cable 510 for an interface such as USB, RS-232C, SCSI, PC card, or the like. Based on commands from the PC 500, the signal processing controller 470 controls operations of each portion of the signal processor 400. Based on commands from the PC 500, the signal processing controller 470 transmits the following to the PC 500: the combined detection signal from the vibration pickups 57a and 57b that was phase adjusted by the phase adjuster 430, the detection signal from the microphone 62, the combined output of the output combiner 440, and the analysis data by the FFTs 451 to 453 stored in the memory 460. The sensitivity adjuster 300 and the signal processor 400 may be configured as software executed on any suitable processor, such as a Central Processing Unit (CPU), or may be configured with a Digital Signal Processor (DSP). The sensitivity adjuster 300 is not limited to analog processing and may be connected between the A/D converter 410 and the frequency characteristic adjuster 420, adjusting the sensitivity by digital processing. The PC 500 may of course be provided with the functions fulfilled by the signal processing controller 470 and the memory 460.

The PC 500 includes a memory 501, a test signal generator 502, an output adjuster 503, and the like. The memory 501 stores a variety of data, such as an application for the measurement device 10 to evaluate the electronic device, test signals, and the like. The memory 501 may be internal memory or external memory. The evaluation application is, for example, copied into the memory 501 from a CD-ROM, downloaded over a network, or the like. The test signals are stored as a required WAV file (audio data), for example, and are read selectively. The WAV files may, for example, be copied from a recording medium or downloaded over a network and stored.

The PC 500 for example displays an application screen on a display 504 based on the evaluation application. Based on information input via the application screen, the PC 500 transmits a command to the signal processor 400. The PC 500 receives a command response and data from the signal processor 400, and based on the received data, executes predetermined processing, displays the measurement results on the application screen, and evaluates the target of measurement.

The test signal generator 502 is preferably configured to allow selective generation and output of a desired single frequency sine wave (pure tone), a pure tone sweep signal in which the frequency sequentially changes across a predetermined frequency range from low frequency to high frequency or high frequency to low frequency (pure tone sweep), and a multi-sine wave signal composed of a plurality of sine wave signals of different frequencies (multi-sine). The predetermined frequency range of the pure tone sweep may be appropriately set over the audible frequency range. The amplitude at the sequential frequencies in the pure tone sweep is preferably the same. The amplitude of each sine wave in the multi-sine is also preferably the same.

In accordance with the signal format of external input to the electronic device 100 targeted for measurement, the output adjuster 503 converts the test signal output from the memory 501 or the test signal generator 502 to a predetermined signal format, such as conversion to an analog signal, and provides the result over a connection cable 511 for an interface such as USB to an external input terminal 105 of the electronic device 100. In the case of the electronic device 100 being a mobile phone, the test signal output from a test signal output unit 502 may be a signal in accordance with standards such as 3GPP2 (3GPP TS26.131/132), VoLTE, or the like.

Figure 12:
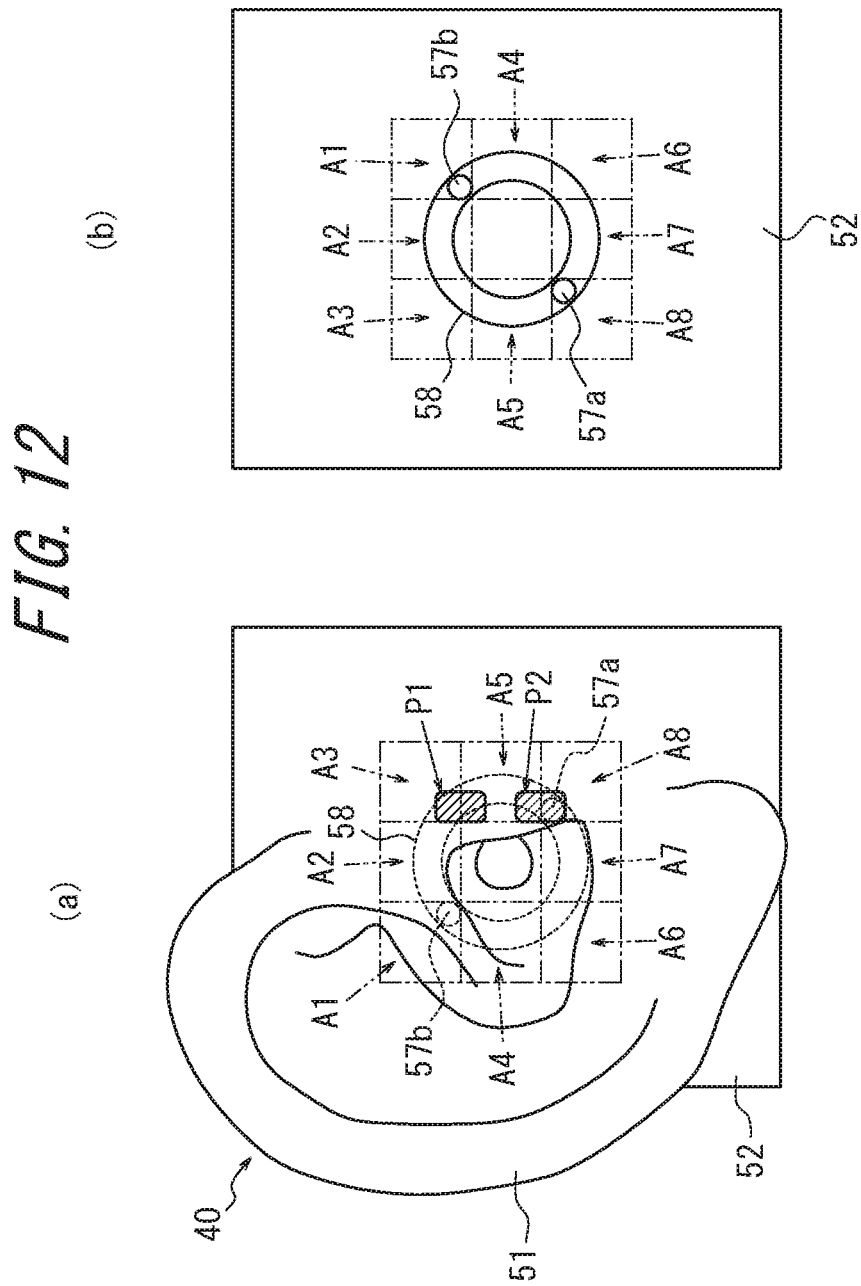
FIGS. 12A and 12B illustrate the vibration measurement head in order to explain gain correction of the output from the two vibration pickups in FIG. 11.

Next, gain correction of the output of the two vibration pickups 57a and 57b is described. FIG. 12A and FIG. 12B are respectively front and back views of the vibration measurement head 40, as seen from the side of the artificial ear 51, in the same state as when a person is standing. In FIGS. 12A and 12B, the surrounding area including the artificial external ear canal 53 is divided into nine equal portions, and the surrounding areas excluding the artificial external ear canal 53 are labeled A1 to A8 for the sake of convenience. The vibration pickup 57a is disposed in area A8 of the vibration transmission member 58, and the vibration pickup 57b is disposed in area A1 of the vibration transmission member 58.

In this configuration, when evaluating an electronic device that includes a vibrating body that only contacts and vibrates a portion of the auricle, as in the hearing aid illustrated in FIGS. 2 and 5, then there may be almost no difference in terms of auditory sensation when the vibrating body is pressed against the hatched pressing area P1 and when the vibrating body is pressed against the hatched pressing area P2. The pressing area P1 is an area located nearly in the center between areas A8 and A1, where the vibration pickups 57a and 57b are disposed, and is an area that extends into areas A3 and A5. The pressing area P2 is an area that extends into area A8, where the vibration pickup 57a is disposed, and area A5 adjacent to area A8.

An experiment that I performed, however, revealed that the vibration component transmitted to the vibration pickup 57a tends to be greater than the vibration component transmitted to the vibration pickup 57b, since the pressing area P2 is disposed directly above the vibration pickup 57a. The main reason is inferred to be that vibration is not completely averaged by the ear model 50 or the vibration transmission member 58. Therefore, it is assumed that if the target of measurement is evaluated by only the output of one vibration pickup, either 57a or 57b, then a difference between the measurement result and the actual auditory sensation may occur depending on the pressing area, which may prevent the target of measurement from being properly evaluated. In the case of an electronic device with a form of use such that the vibrating body covers the area around the artificial external ear canal 53, as illustrated in FIG. 1, an averaged vibration is transmitted. Therefore, it is assumed that even when vibration is detected with one vibration pickup, either 57a or 57b, nearly no difference from the actual auditory sensation will occur. Accordingly, the target of evaluation can be properly evaluated even when evaluating the target of measurement with only the output of one vibration pickup, either 57a or 57b.

Figure 13:
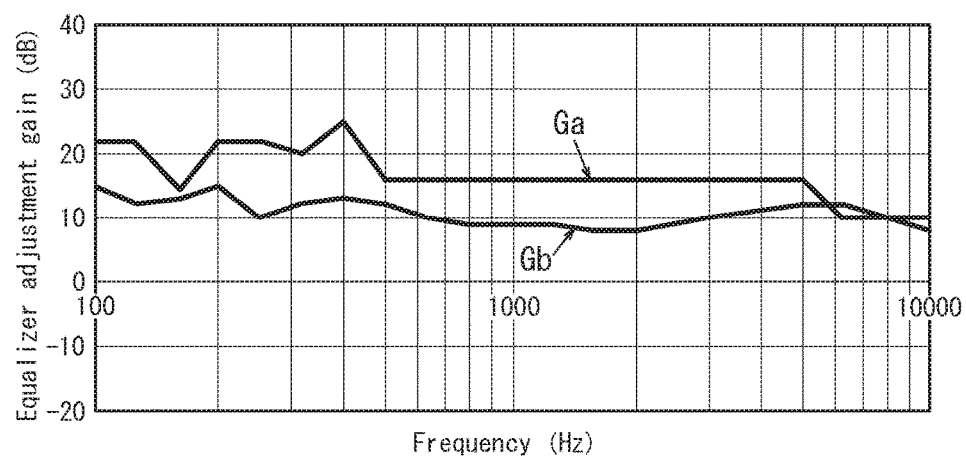
FIG. 13 schematically illustrates gain characteristics of the two equalizers corresponding to the two vibration pickups in FIG. 11.

To address this issue, the measurement device 10 of this embodiment corrects the gain of the equalizers 421a and 421b so that the output of the combining circuit 423 is nearly the same at each frequency when the same vibrating body is either pressed against the pressing area P1 and caused to vibrate by a pure tone sweep signal or pressed against the pressing area P2 and caused to vibrate by a pure tone sweep signal. FIG. 13 schematically illustrates the gain characteristics of the equalizers 421a and 421b after correction. In FIG. 13, the horizontal axis represents the frequency (Hz), and the vertical axis represents gain (dB). Ga indicates the gain characteristics of the equalizer 421a, and Gb indicates the gain characteristics of the equalizer 421b.

With the measurement device 10 of this embodiment, when an electronic device that includes a vibrating body that transmits vibration by contacting only a portion of an auricle, as in the examples illustrated in FIGS. 2 and 5, is contacted to any position of the auricle of the artificial ear 51 and vibrates the auricle, an amount of vibration weighted for the characteristics of vibration transmission in a human ear can be properly measured and the target of measurement can be properly evaluated. Of course, for an electronic device that includes a vibrating body that transmits vibration by contacting an auricle so as to cover the auricle, as in the example illustrated in FIG. 1, an amount of vibration weighted for characteristics of vibration transmission in a human ear can similarly be properly measured, and the target of measurement can be properly evaluated. With the measurement device 10 of this embodiment, by combining the output of the two vibration pickups 57a and 57b, the S/N ratio of the vibration detection signal can also be improved.

Embodiment 2

Figure 14:
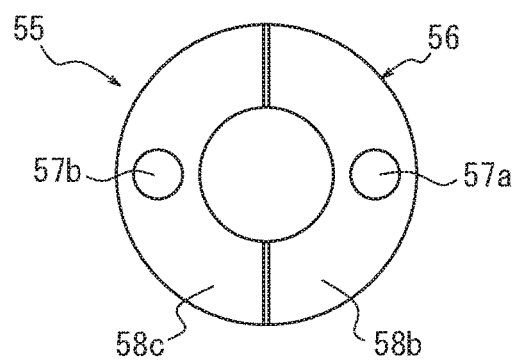
FIG. 14 schematically illustrates the structure of a section of a measurement device according to Embodiment 2.

In the measurement device of Embodiment 2, the structure of the vibration detector 55 in the measurement device 10 of Embodiment 1 differs. As illustrated in FIG. 14, the vibration detector 55 includes two vibration transmission members 58b and 58c. The two vibration transmission members 58b and 58c are each shaped as half of the ring-shaped vibration transmission member 58 illustrated in FIGS. 9A and 9B. The vibration pickup 57a is disposed in the central region of the arc-shaped vibration transmission member 58b. The vibration pickup 57b is disposed in the central region of the arc-shaped vibration transmission member 58c. As in Embodiment 1, the vibration transmission members 58b and 58c are attached to the end face of the artificial external ear canal unit 52 opposite from the artificial ear 51, preferably so that one vibration pickup 57a is positioned to correspond to the tragus of the artificial ear 51 and the other vibration pickup 57b is positioned to correspond to the antitragus.

According to this embodiment, the vibration pickups 57a and 57b are disposed on the vibration transmission members 58b and 58c that are separate from each other. Therefore, the vibration waves transmitted to the vibration transmission member 58b do not affect the vibration transmission member 58c. Similarly, the vibration waves transmitted to the vibration transmission member 58c do not affect the vibration transmission member 58b. Accordingly, the vibrations detected by the vibration pickups 57a and 57b do not interfere with each other, thereby allowing the vibration to be detected more accurately.

Embodiment 3

Figure 15:
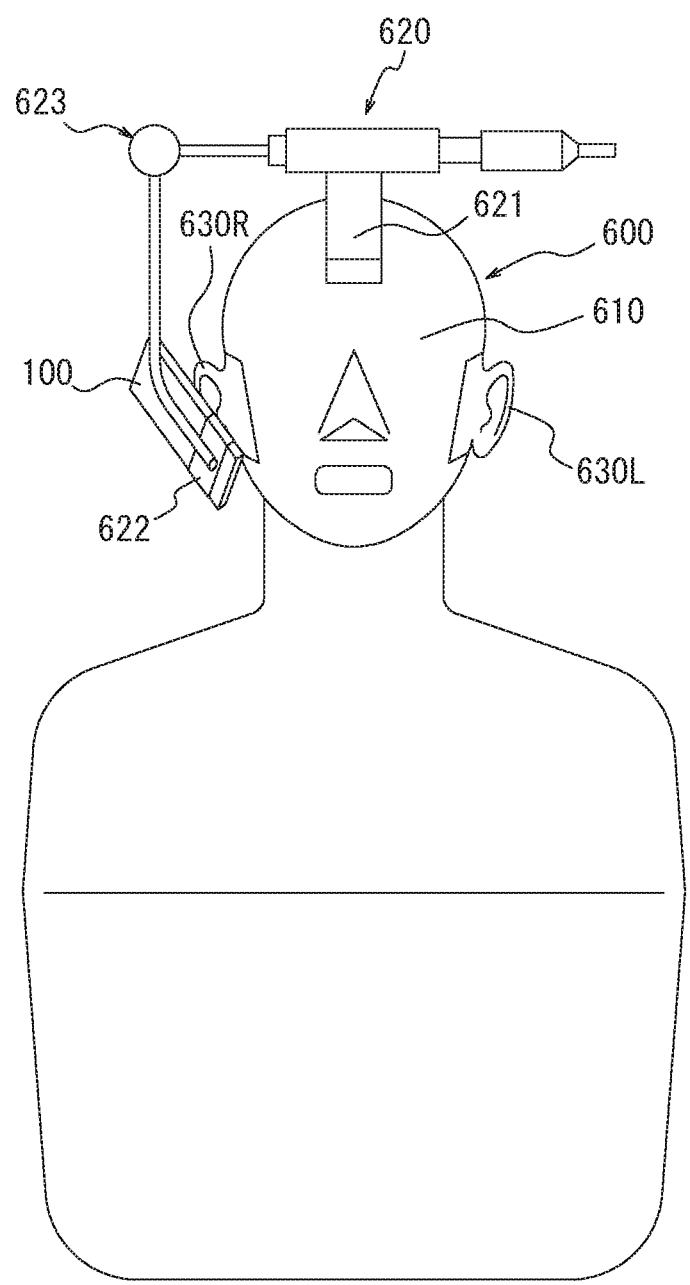
FIG. 15 schematically illustrates the structure of a section of a measurement device according to Embodiment 3.

FIG. 15 schematically illustrates the structure of an electronic device mount in a measurement device according to Embodiment 3. The electronic device mount 600 illustrated in FIG. 15 includes a human head model 610 and a holder 620 that holds the electronic device 100 targeted for measurement. The head model 610 is, for example, HATS, KEMAR, or the like. Left and right artificial ears 630L and 630R of the head model 610 are detachable from the head model 610. The artificial ears 630L and 630R each form the vibration measurement head described in Embodiment 1 or Embodiment 2 and are either connected selectively to the same measurement unit or are connected to separate measurement units.

A holder 620 is attached to the head model 610 detachably and includes a head fixing portion 621 for fixing to the head model 610, a support 622 that supports the electronic device 100 targeted for measurement, and an articulated arm 623 connecting the head fixing portion 621 and the support 622. The holder 620 is configured so that, like the holder 70 in Embodiment 1, the pressing force and contact position, on one artificial ear (in FIG. 15, the artificial ear on the right side) 630R, of the electronic device 100 supported by the support 622 can be adjusted via the articulated arm 623. When the target of measurement is an electronic device that transmits vibration to only a portion of a human ear, as illustrated in FIGS. 2 and 5, the target of measurement is not supported by the support 622, but rather is held directly by the artificial ear 630L or 630R. The remaining structure of the measurement unit and the like is similar to that of Embodiment 1.

The measurement device according to this embodiment achieves effects similar to those of the measurement device 10 in Embodiment 1. Among other effects, in this embodiment, the electronic device is evaluated by detachably mounting the artificial ear 630 that forms a vibration measurement head on the human head model 610, thus allowing evaluation that conforms more closely to the actual form of use by taking into consideration the effect of the head.

Embodiment 4

Figure 16:
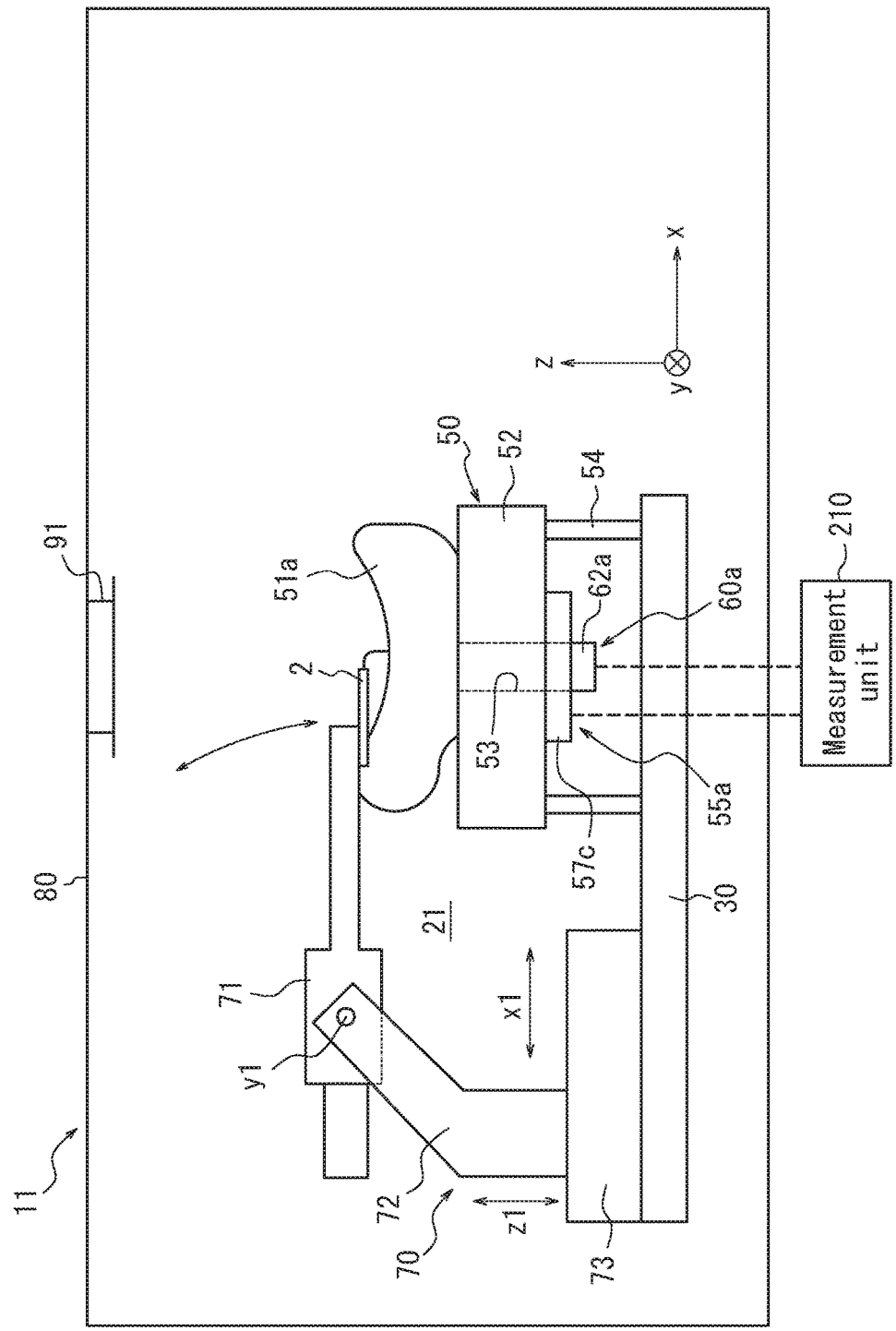
FIG. 16 schematically illustrates the structure of a measurement system according to Embodiment 4.

FIG. 16 schematically illustrates the structure of a measurement system 11 according to Embodiment 4. The measurement system 11 of this embodiment includes an acoustic device mount 21, a measurement unit 210, an anechoic space 80, and speakers 91 and 92. Of the two speakers 91 and 92, only the speaker 91 is illustrated in FIG. 16. In the following explanation, the same structural components as in the above-described embodiments are assigned the same reference signs. The acoustic device mount 21 is provided with an ear model 50 supported by a base 30 and with a holder 70 that supports an acoustic device 1 targeted for measurement. The acoustic device 1 includes a vibrating body and transmits sound to a user by contacting the vibrating body to a human auricle. The acoustic device 1 is, for example, a hearing aid or is a mobile phone, such as a smartphone, that includes a rectangular panel larger than a human ear on a surface of a rectangular housing, with the panel vibrating as a vibrating body. The anechoic space 80 is a space, formed by an anechoic chamber or the like, with no reflected sound. The speaker 91, speaker 92, and acoustic device mount 21 are housed inside the anechoic space 80.

Figure 17:
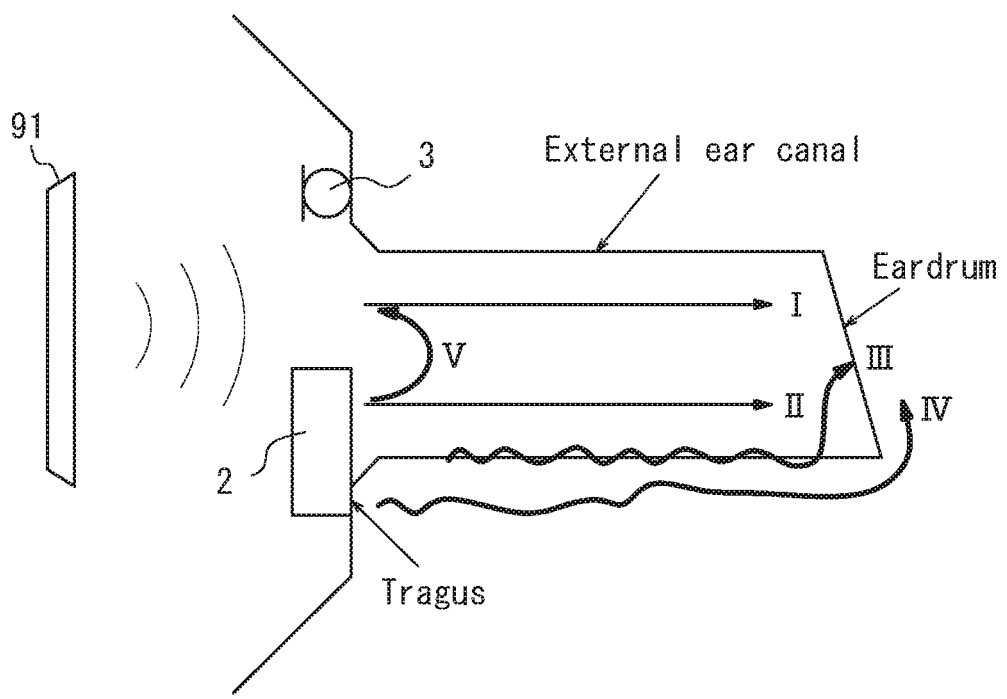
FIG. 17 schematically illustrates the acoustic device in FIG. 16.

FIG. 17 schematically illustrates the disclosed acoustic device 1 and the transmission of sound. FIG. 17 illustrates an example of the acoustic device 1 being a hearing aid. When the acoustic device 1 is a hearing aid, the acoustic device 1 includes a microphone 3 in addition to a vibrating body 2. The microphone 3 collects sound from the speakers 91 and 92. The vibrating body 2 amplifies the sound collected by the microphone 3 and transmits the sound to the user by vibration. Only the speaker 91 is illustrated in FIG. 17, whereas the speaker 92 is omitted.

As illustrated in FIG. 17, sound from the speakers 91 and 92 passes through the external ear canal from a portion not covered by the vibrating body 2 and reaches the eardrum directly (path I). Air-conducted sound due to vibration of the vibrating body 2 passes through the external ear canal and reaches the eardrum (path II). Due to the vibration of the vibrating body 2, at least the inner wall of the external ear canal vibrates, and air-conducted sound due to this vibration of the external ear canal (external ear canal radiated sound) reaches the eardrum (path III). Furthermore, vibration sound due to the vibration of the vibrating body 2 reaches the auditory nerve directly without passing through the eardrum (path IV). A portion of the air-conducted sound produced by the vibrating body 2 escapes to the outside (path V).

Next, the structure of the acoustic device mount 21 on which the acoustic device 1 is mounted is described. The ear model 50 is modeled after a human ear and includes an artificial auricle 51a and artificial external ear canal unit 52 joined to the artificial auricle 51a. An artificial external ear canal 53 is formed in the central region of the artificial external ear canal unit 52. The ear model 50 is supported by the base 30 via a support member 54 at the periphery of the artificial external ear canal unit 52.

The ear model 50 is made from similar material to the material of an average artificial auricle used in, for example, a manikin such as a Head And Torso Simulator (HATS), Knowles Electronic Manikin for Acoustic Research (KE-MAR), or the like, such as material conforming to IEC 60318-7. This material may, for example, be formed with a material such as rubber having a hardness of 35 to 55. The rubber may also be softer than a Shore hardness of 35, such as a Shore hardness of approximately 15 to 30. These degrees of hardness may, for example, be measured in conformity with International Rubber Hardness Degrees (IRHD/M) conforming to JIS K 6253, ISO 48, or the like. As a hardness measurement system, a fully automatic IRHD/M micro-size international rubber hardness gauge GS680 by Teclock Corporation may suitably be used. Considering the variation in ear hardness due to age, as a rule of thumb, approximately two or three types of the ear model 50 with a different hardness are preferably prepared and used interchangeably.

The thickness of the artificial external ear canal unit 52, i.e. the length of the artificial external ear canal 53, corresponds to the length up to the human eardrum (cochlea) and for example is suitably set in a range of 20 mm to 40 mm. In this embodiment, the length of the artificial external ear canal 53 is approximately 30 mm.

In the ear model 50, a vibration sound detector 55a is disposed on the end face of the artificial external ear canal unit 52 on the opposite side from the artificial auricle 51a, at a position in the peripheral portion of the opening of the artificial external ear canal 53. The vibration sound detector 55a detects the amount of vibration transmitted through the artificial external ear canal unit 52 when the vibrating body of the acoustic device 1 is placed against the ear model 50. In other words, the vibration sound detector 55a detects the amount of vibration corresponding to the vibration sound component that is heard without passing through the eardrum when the vibrating body of the acoustic device 1 is pressed against a human ear and vibration of the vibrating body of the acoustic device 1 directly vibrates the inner ear. As used here, vibration sound refers to sound that is transmitted to the user's auditory nerve through a portion of the user's body (such as the cartilage of the outer ear) that is contacting a vibrating object. The vibration sound detector 55a may, for example, be configured using a vibration detection element 57c that for example has flat output characteristics in the measurement frequency range of the acoustic device 1 (for example, from 0.1 kHz to 30 kHz), is lightweight, and can accurately measure even slight vibrations. An example of this vibration detection element 57c is a piezoelectric acceleration pickup or other such vibration pickup, such as the vibration pickup PV-08A produced by Rion Corporation or the like.

FIG. 18A is a plan view of the ear model 50 from the base 30 side. While FIG. 18A illustrates an example of providing a ring-shaped vibration detection element 57c that surrounds the peripheral portion of the opening of the artificial external ear canal 53, a plurality of vibration detection elements 57c may be provided instead of only one. In the case of providing a plurality of vibration detection elements 57c, the vibration detection elements 57c may be disposed at appropriate intervals at the periphery of the artificial external ear canal 53, or two arc-shaped vibration detection elements 57c may be disposed to surround the periphery of the opening in the artificial external ear canal 53. In FIG. 18A, the artificial external ear canal unit 52 is rectangular, yet the artificial external ear canal unit 52 may be any shape.

An air-conducted sound detector 60a is disposed in the ear model 50. The air-conducted sound detector 60a measures the sound pressure of sound propagating through the artificial external ear canal 53. In other words, the air-conducted sound detector 60a measures the sound pressure produced when the vibrating body of the acoustic device 1 is pressed against a human ear. This sound pressure includes sound pressure corresponding to air-conducted sound that is heard directly through the eardrum by air vibrating due to vibration of the vibrating body of the acoustic device 1 and sound pressure corresponding to air-conducted sound representing sound, heard through the eardrum, that is produced in the ear itself by the inside of the external ear canal vibrating due to vibration of the vibrating body of the acoustic device 1. Air-conducted sound is sound transmitted to the user's auditory nerve by air vibrations, caused by a vibrating object, that are transmitted through the external ear canal to the eardrum and cause the eardrum to vibrate. When a different sound source from the acoustic device 1 exists, the air-conducted sound detector 60*a* also measures sound pressure of direct sound from this sound source.

As illustrated by the cross-sectional view in FIG. 18B along the b-b line in FIG. 18A, the air-conducted sound detector 60*a* includes a microphone 62*a* held by a tube member 61 that extends from the outer wall (peripheral wall of the hole) of the artificial external ear canal 53 through the opening of the ring-shaped vibration detection element 57*c*. The microphone 62*a* is, for example, configured using a measurement capacitor microphone that has a low self-noise level and that has flat output characteristics in the measurement frequency range of the acoustic device 1. The capacitor microphone UC-53A produced by Rion Corporation may, for example, be used as the microphone 62*a*. The microphone 62*a* may be disposed so that the sound pressure detection face nearly matches the end face of the artificial external ear canal unit 52. The microphone 62*a* may, for example, be supported by the artificial external ear canal unit 52 or the base 30 and disposed in a floating state with respect to the outer wall of the artificial external ear canal 53.

Next, the holder 70 is described. The holder 70 is provided with a support 71 that supports the acoustic device 1. The support 71 is attached to one end of an arm 72 so as to be rotatable about an axis y1, which is parallel to the y-axis, in a direction to press the acoustic device 1 (only the vibrating body 2 of the acoustic device 1 being illustrated schematically in FIG. 16) against the ear model 50. The other end of the arm 72 is joined to a movement adjuster 73 provided on the base 30. The movement adjuster 73 can adjust movement of the arm 72 in a vertical direction x1 of the acoustic device 1 supported by the support 71, the direction x1 being parallel to the x-axis that is orthogonal to the y-axis, and in a direction z1 that presses the acoustic device 1 against the ear model 50, the direction z1 being parallel to the z-axis that is orthogonal to the y-axis and the x-axis.

In this way, in the acoustic device 1 supported by the support 71, the pressing force, against the ear model 50, of the vibrating body is adjusted by rotating the support 71 about the axis y1 or by moving the arm 72 in the z1 direction. In this embodiment, the pressing force is adjusted in a range of 0 N to 10 N. Of course, the support 71 may also be configured to rotate freely about other axes in addition to the y1 axis.

The case of 0 N may, for example, include not only the case of contacting without pressing against the ear model 50, but also the case of holding the acoustic device 1 at a distance from the ear model 50 in increments of 1 cm and measuring at each distance. This approach also allows measurement with the microphone 62*a* of the degree of damping of air-conducted sound due to distance, thus making the measurement system more convenient.

By adjusting movement of the arm 72 in the x1 direction, the contact position of the acoustic device 1 with respect to the ear model 50 can be adjusted so that, for example as illustrated in FIG. 16, the vibrating body 2 covers a portion of the ear model 50. A configuration may also be adopted to allow adjustment of the acoustic device 1 to a variety of contact positions with respect to the ear model 50 by making movement of the arm 72 adjustable in a direction parallel to the y-axis, or by making the arm 72 rotatable about an axis parallel to the x-axis or the z-axis. The vibrating body 2 is not limited to an object like a panel that widely covers the ear, and for example an acoustic device having a protrusion or corner that transmits vibration to only a portion of the ear model 50, such as the tragus, may be targeted for measurement.

FIGS. 19A and 19B illustrate the detailed structure of the anechoic space 80 of the measurement system 11 according to Embodiment 4, illustrating details on the positional relationship between the speakers 91 and 92 and the ear model 50 and details on the structure of the anechoic space 80. FIGS. 19A and 19B are views in the z-axis direction and the y-axis direction respectively. As illustrated in FIGS. 19A and 19B, the anechoic space 80 includes a plurality of wedge-shaped sound absorption layers 81 and forms a space with no reflected sound or with extremely little reflected sound. The anechoic space 80 includes a connection hole 82 for connection to the outside. The connection hole 82 is used for connection to the measurement unit 210. As illustrated in FIG. 19A, the speaker 92 is provided on the side of the anechoic space 80 in the negative direction of the y-axis (in the front direction of the human face). In other words, the speaker 92 is disposed at a position with an angle of 0°, where the front direction of a virtual human provided with the ear model 50 is at an angle of 0° with respect to the ear model 50. The speaker 92 is thus used to emit sound from the front direction of the face. The speaker 92 is connected to a test sound provider 700 (described below) of the measurement unit 210 and emits sound provided by the test sound provider 700.

As illustrated in FIG. 19B, the speaker 91 is provided on the side of the anechoic space 80 in the positive direction of the z-axis (in the front direction of the artificial auricle 51*a*). In other words, the speaker 91 is disposed at a position with an angle of 90°, where the front of a virtual human provided with the ear model 50 is at an angle of 0° with respect to the ear model 50. The speaker 91 is thus used to emit sound straight from the side of the face (the front direction of the ear). The speaker 91 is connected to the test sound provider 700 (described below) of the measurement unit 210 and emits sound provided by the test sound provider 700.

As illustrated in FIGS. 19A and 19B, the measurement system 11 preferably includes a semispherical model 59 that models half (one side) of a human head, and the artificial auricle 51*a* is preferably detachable from the semispherical model 59. By providing the semispherical model 59, for example reflection of sound by a human head can be more accurately reproduced. The semispherical model 59 is configured so that both a left ear model and a right ear model are detachable. In FIG. 19, the artificial auricle 51*a* is an ear model of the right ear, yet the artificial auricle 51*a* may instead be an ear model of the left ear.

Figure 20:
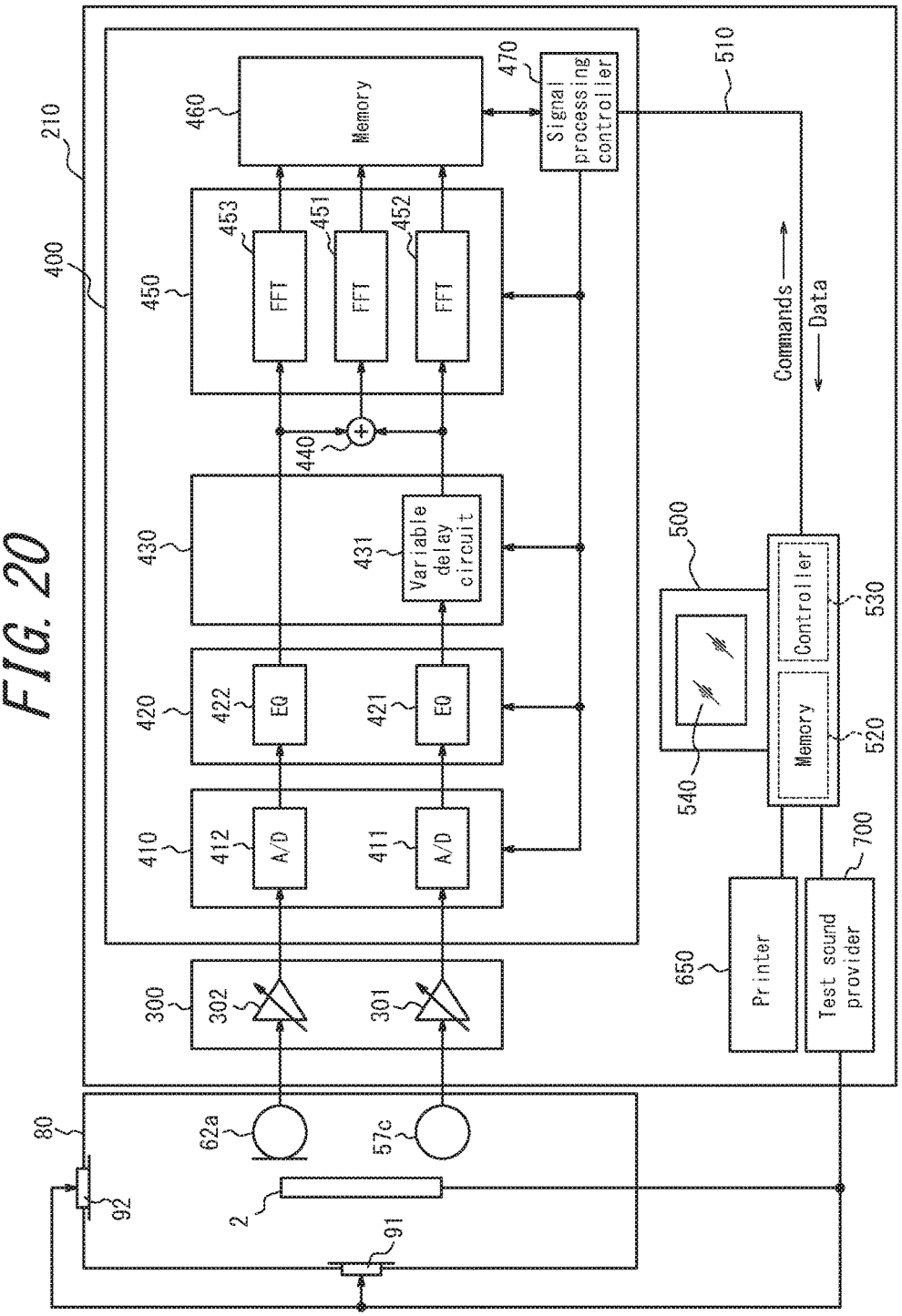
FIG. 20 is a functional block diagram illustrating the structure of a section of the measurement unit in FIG. 16.

Next, the structure of the measurement unit 210 in FIG. 16 is described. FIG. 20 is a functional block diagram illustrating the structure of a section of the measurement unit 210. In this embodiment, the measurement unit 210 measures the amount of vibration and the sound pressure transmitted through the ear model 50 by vibration of the acoustic device 1 targeted for measurement, i.e. sensory sound pressure that combines vibration sound and air-conducted sound, and includes a sensitivity adjuster 300, signal processor 400, personal computer (PC) 500, printer 650, and test sound provider 700.

Output of the vibration detection element 57*c* and the microphone 62*a* is provided to the sensitivity adjuster 300. The sensitivity adjuster 300 includes a variable gain amplifier circuit 301 that adjusts the amplitude of the output of the vibration detection element 57*c* and a variable gain amplifier circuit 302 that adjusts the amplitude of the output of the microphone 62*a*. The amplitudes of analog input signals, corresponding to the respective circuits, are independently adjusted to required amplitudes either manually or automatically. Error in the sensitivity of the vibration detection element 57c and the sensitivity of the microphone 62a is thus corrected. The variable gain amplifier circuits 301 and 302 are configured to allow adjustment of the amplitude of the input signals over a range of, for example, ±50 dB.

Output of the sensitivity adjuster 300 is input into the signal processor 400. The signal processor 400 includes an A/D converter 410, frequency characteristic adjuster 420, phase adjuster 430, output combiner 440, frequency analyzer 450, memory 460, and signal processing controller 470. The A/D converter 410 includes an A/D conversion circuit (A/D) 411 that converts the output of the variable gain amplifier circuit 301 into a digital signal and an A/D conversion circuit (A/D) 412 that converts the output of the variable gain amplifier circuit 302 into a digital signal. The analog input signal corresponding to each circuit is thus converted into a digital signal. The A/D conversion circuits 411 and 412 can preferably support, for example, 16 bits or more, which is 96 dB or more by dynamic range conversion. The A/D conversion circuits 411 and 412 may be configured so that the dynamic range is changeable.

Output of the A/D converter 410 is provided to the frequency characteristic adjuster 420. The frequency characteristic adjuster 420 includes an equalizer (EQ) 421 that adjusts the frequency characteristics of the detection signal from the vibration detection element 57c, i.e. the output of the A/D conversion circuit 411, and an equalizer (EQ) 422 that adjusts the frequency characteristics of the detection signal from the microphone 62a, i.e. the output of the A/D conversion circuit 412. The frequency characteristics of the respective input signals are independently adjusted to frequency characteristics near the auditory sensation of the human body either manually or automatically. The equalizers 421 and 422 may, for example, be configured with a graphical equalizer having a plurality of bands, a low pass filter, a high pass filter, or the like. The order in which the equalizers (EQ) and the A/D conversion circuits are disposed may be reversed.

Output of the frequency characteristic adjuster 420 is provided to the phase adjuster 430. The phase adjuster 430 includes a variable delay circuit 431 that adjusts the phase of the detection signal from the vibration detection element 57c, i.e. the output of the equalizer 421. Since the speed of sound transmitted through the material of the ear model 50 is not exactly the same as the speed of sound transmitted through human muscle or bone, it is assumed that the phase relationship between the output of the vibration detection element 57c and the output of the microphone 62a will be shifted from that of a human ear, the shift being greater at high frequencies.

If the phase relationship between the output of the vibration detection element 57c and the output of the microphone 62a thus shifts greatly, then upon combining the two outputs with the below-described output combiner 440, amplitude peaks and dips may appear at different values than in actuality, and the combined output may be amplified or diminished. For example, if the transmission speed of sound detected by the microphone 62a is 0.2 ms slower than the transmission speed of vibration detected by the vibration detection element 57c, then the combined output of both as sinusoidal vibration at 2 kHz is as illustrated in FIG. 21A. By contrast, the combined output when there is no misalignment in the transmission speeds is as illustrated in FIG. 21B, and amplitude peaks and dips appear at unnatural times. In FIGS. 21A and 21B, the bold line indicates a vibration waveform detected by the vibration detection element 57c, the thin line indicates a sound pressure waveform detected by the microphone 62a, and the dashed line indicates the waveform of the combined output.

In this embodiment, in accordance with the measurement frequency range of the acoustic device 1 targeted for measurement, the phase of the detection signal from the vibration detection element 57c, which is the output of the equalizer 421, is adjusted over a predetermined range by the variable delay circuit 431. For example, in the case of the measurement frequency range of the acoustic device 1 being from 100 Hz to 10 kHz, the phase of the detection signal from the vibration detection element 57c is adjusted by the variable delay circuit 431 over a range of approximately ±10 ms (corresponding to ±100 Hz) at least in increments smaller than 0.1 ms (corresponding to 10 kHz). In the case of a human ear as well, phase misalignment occurs between vibration sound and air-conducted sound. Therefore, phase adjustment by the variable delay circuit 431 does not refer to matching the phase of the detection signals from the vibration detection element 57c and the microphone 62a, but rather to matching the phase of these detection signals to the actual auditory sensation by the ear.

Output of the phase adjuster 430 is provided to the output combiner 440. The output combiner 440 combines the detection signal from the vibration detection element 57c, after phase adjustment by the variable delay circuit 431, with the detection signal from the microphone 62a, that has passed through the phase adjuster 430. This allows approximation of the human body in obtaining sound pressure (sensory sound pressure) that combines the amount of vibration and the sound pressure, i.e. the vibration sound and the air-conducted sound, transmitted by vibration of the acoustic device 1 targeted for measurement.

The combined output of the output combiner 440 is input into the frequency analyzer 450. The frequency analyzer 450 includes a Fast Fourier Transform (FFT) 451 that performs frequency analysis on the combined output of the output combiner 440. In this way, power spectrum data corresponding to the combined sound (air+vib), in which the vibration sound (vib) and the air-conducted sound (air) are combined, are obtained from the FFT 451.

In this embodiment, the frequency analyzer 450 is provided with FFTs 452 and 453 that perform frequency analysis on the signals before combination by the output combiner 440, i.e. on the detection signal, from the vibration detection element 57c, that has passed through the phase adjuster 430 and the detection signal from the microphone 62a. In this way, power spectrum data corresponding to the vibration sound (vib) are obtained from the FFT 452, and power spectrum data corresponding to the air-conducted sound (air) are obtained from the FFT 453.

In the FFTs 451 to 453, analysis points are set for the frequency component (power spectrum) in correspondence with the measurement frequency range of the acoustic device 1. For example, when the measurement frequency range of the acoustic device 1 is 100 Hz to 10 kHz, analysis points are set so as to analyze the frequency component at each point when dividing the interval in a logarithmic graph of the measurement frequency range into 100 to 2000 equal portions.

The output of the FFTs 451 to 453 is stored in the memory 460. The memory 460 has the capacity of at least a double buffer that can store a plurality of analysis data sets (power spectrum data) for each of the FFTs 451 to 453. The memory 460 is configured to always allow transmission of the latest data upon a data transmission request from the below-described PC 500.

The signal processing controller 470 is connected to the PC 500 via a connection cable 510 for an interface such as LAN, USB, RS-232C, SCSI, PC card, or the like. Based on commands from the PC 500, the signal processing controller 470 controls operations of each portion of the signal processor 400. The signal processor 400 may be configured as software executed on any suitable processor, such as a Central Processing Unit (CPU), or may be configured with a Digital Signal Processor (DSP).

The PC 500 includes an evaluation application that presents acoustic characteristics of the acoustic device 1 using the measurement system 11. The evaluation application, for example, is copied from a CD-ROM or downloaded over a network or the like and is stored in a memory 520. The PC 500 executes the evaluation application with a controller 530. The PC 500 for example displays an application screen on a display 540 based on the evaluation application. Based on information input via the application screen, the PC 500 transmits a command to the signal processor 400. The PC 500 receives a command response and data from the signal processor 400, and based on the received data, executes predetermined processing and displays the measurement results on the application screen. As necessary, the PC 500 outputs the measurement results to the printer 650 to print the measurement results.

In FIG. 20, the sensitivity adjuster 300 and the signal processor 400 may, for example, be mounted on the base 30 of the acoustic device mount 21, with the PC 500 and printer 650 being disposed separately from the base 30, and the signal processor 400 and PC 500 being connected by a connection cable 510.

With a non-illustrated test signal generator, the test sound provider 700 can generate a single frequency sine wave signal (pure tone), a pure tone sweep signal, a multi-sine wave, a warble tone, band noise, or the like. The test sound provider 700 provides the test sound to the speaker 91 or the speaker 92. Instead of providing the test sound to the speaker 91 or the speaker 92, the test sound provider 700 may be connected to an external terminal of the acoustic device 1 and input the test sound to the acoustic device 1 as an input signal.

The test sound provider 700 adjusts the sound to provide based on a head-related transfer function and then provides the sound. A head-related transfer function represents the change occurring in sound due to a portion of the body (auricle, head, shoulders, and the like) as a transfer function. The head-related transfer function differs according to the direction of sound. For example, the head-related transfer function differs for sound from a direction of 0° (sound from the speaker 92) and sound from a direction of 90° (sound from the speaker 91). The test sound provider 700 adjusts the sounds to provide to the speaker 91 and to the speaker 92 with an equalizer (not illustrated) based on the respective head-related transfer functions and then provides the sounds by outputting the adjusted sounds to the speaker 91 and the speaker 92. The head-related transfer functions for 0° and 90° are stored in the memory 520 or the like in advance.

Figure 22:
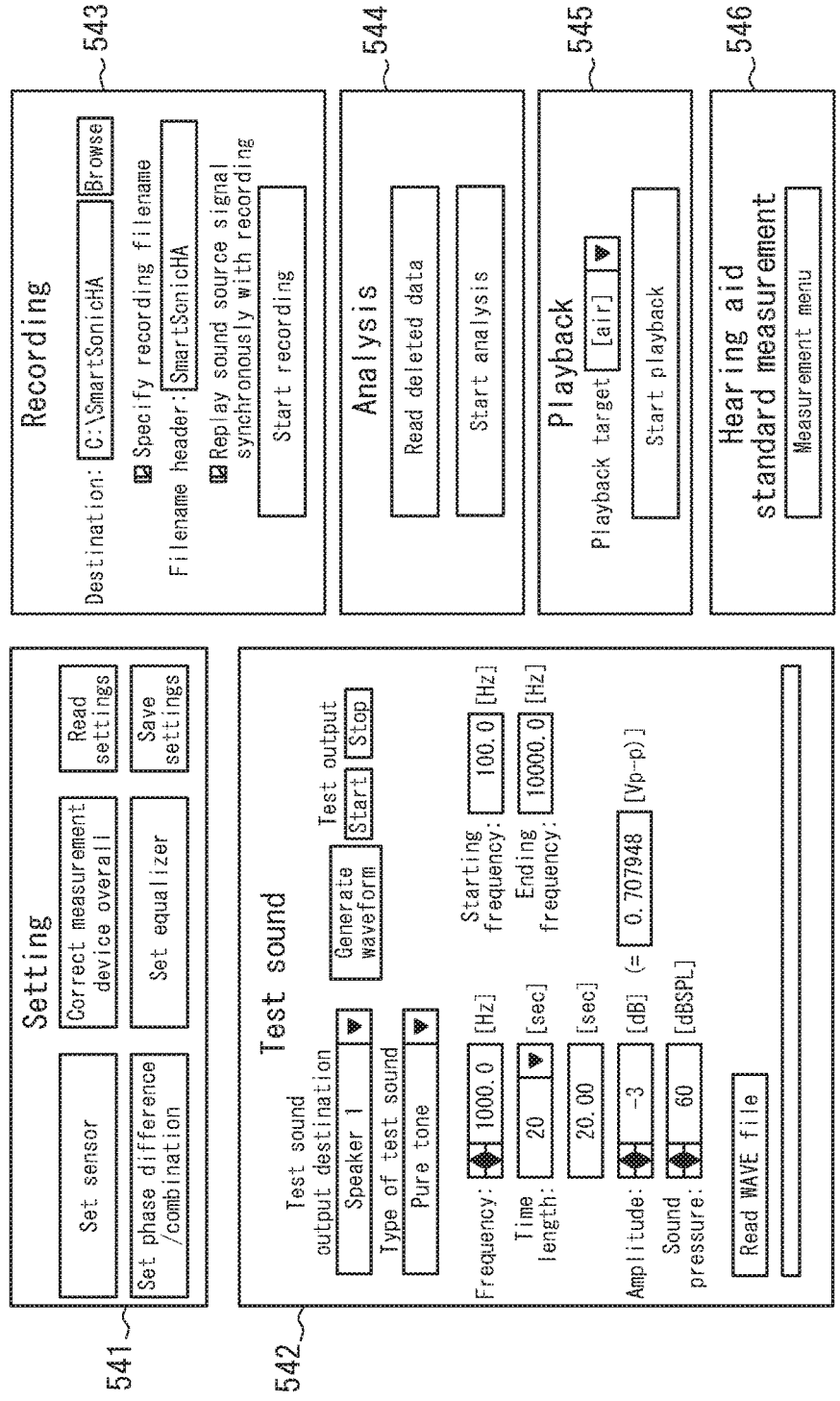
FIG. 22 illustrates an example of an application screen.

FIG. 22 illustrates an example of an application screen displayed on the display 540. The application screen in FIG. 22 includes a setting menu 541, test sound menu 542, recording menu 543, analysis menu 544, playback menu 545, and hearing aid standard measurement menu 546. With the setting menu 541, the user makes sensor settings for the measurement system 11; corrects the entire measurement device, including the speakers and microphone; reads setting information that was adjusted and stored in the past; sets the phase difference and combination of air-conducted sound and vibration sound; sets the equalizers; and stores the currently adjusted setting information.

With the test sound menu 542, the user can select one of the speaker 91 ("speaker 1"), the speaker 92 ("speaker 2"), and the acoustic device 1 as the destination of the test sound. The user can set the type of test sound to either a pure tone or a pure tone sweep. The user can adjust the frequency, duration, amplitude, and sound pressure of the test sound. When setting the type of test sound to a pure tone sweep, the user can set the starting frequency and ending frequency. The user can also read an audio file in a format such as WAVE as the test sound.

With the recording menu 543, the user can store (record) measurement results in a predetermined location and can store the measurement results after attaching a predetermined filename header. With the analysis menu 544, the user can read previously recorded data and perform a variety of analyses. With the playback menu 545, among sound emitted by the acoustic device 1, the user can play back air-conducted sound, vibration sound, or combined sound that is a combination thereof. With the hearing aid standard measurement menu 546, the user can automatically execute all measurements pertaining to standard items for a hearing aid.

Figure 23:
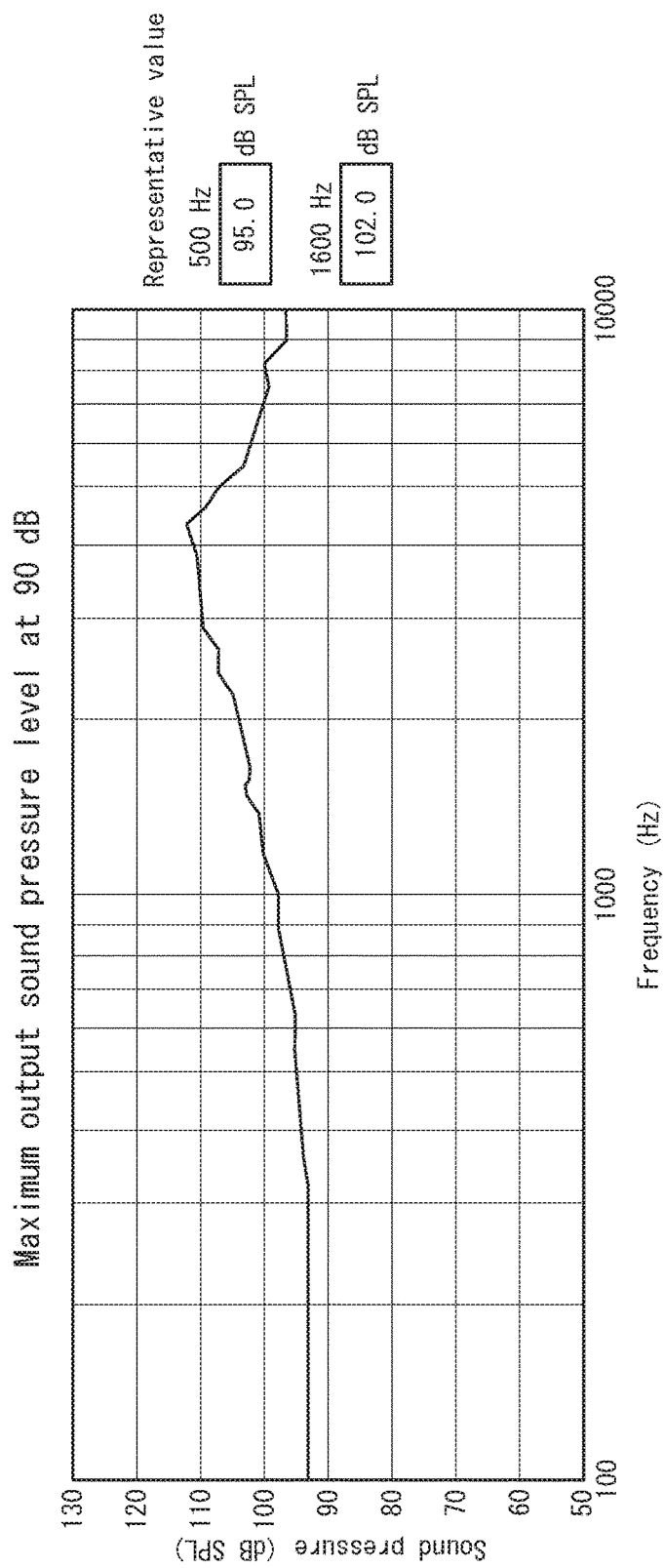
FIG. 23 illustrates an example of a measurement result screen.

FIG. 23 illustrates an example of a measurement result screen displayed on the display 540. The measurement result screen in FIG. 23 is an example of a standard measurement item for a hearing aid. FIG. 23 displays the frequency characteristics (power spectrum data) of combined sound that combines the value detected by the air-conducted sound detector 60a and the value detected by the vibration sound detector 55a for the output sound from the acoustic device 1 when a sound pressure of 90 dB, which is a predetermined sound pressure, is output from the speaker 91. The measurement result screen of FIG. 23 indicates the power spectrum data for each frequency and also respectively indicates the output sound pressures at 500 Hz and 1600 Hz as representative values.

This embodiment allows measurement of the characteristics of the acoustic device 1 that transmits sound to a user by contacting a vibrating body to a human auricle and also allows measurement of standard measurement items for a hearing aid.

Figure 24:
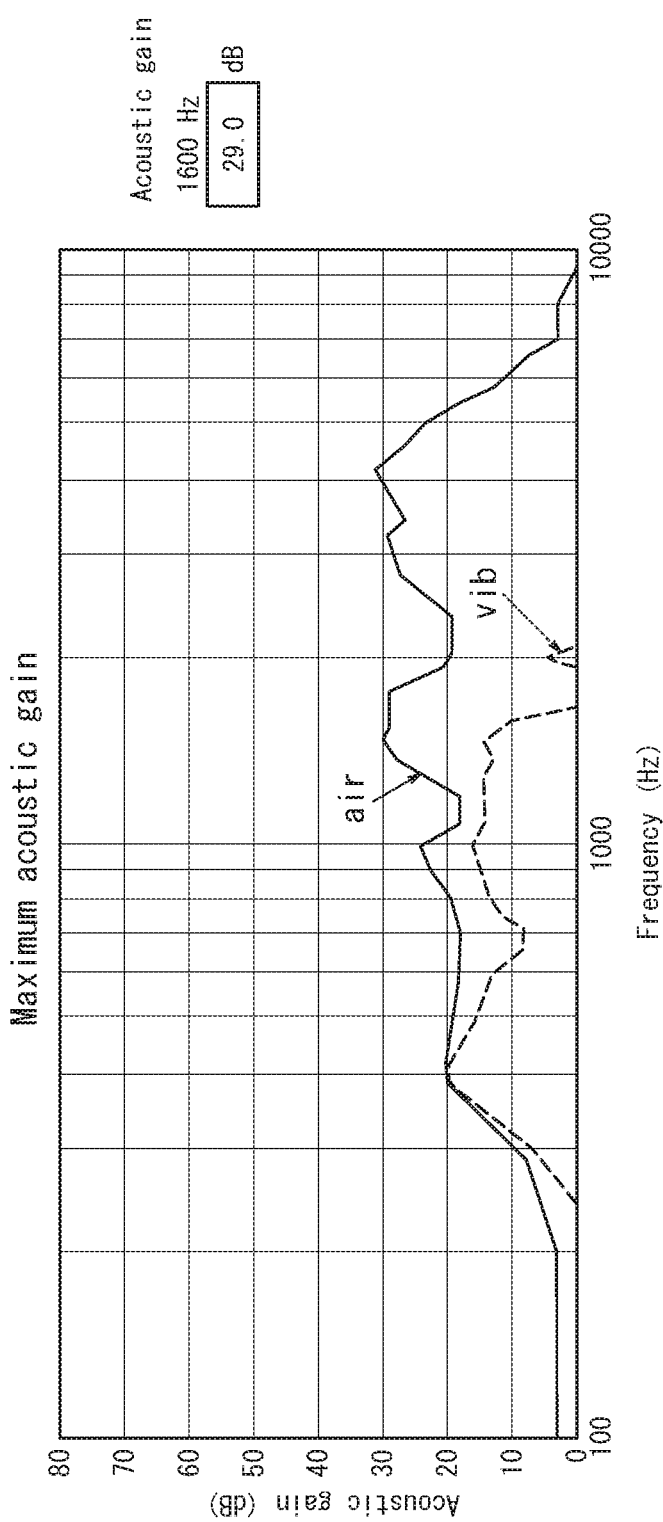
FIG. 24 illustrates another example of a measurement result screen.

FIG. 24 illustrates another example of a measurement result screen displayed on the display 540. The measurement result screen in FIG. 24 illustrates spectrum data representing, at each frequency, the degree of amplification (maximum acoustic gain), with respect to input sound, of output sound that is output by the acoustic device 1. In the measurement result screen in FIG. 24, the maximum acoustic gain is displayed for each of the air-conducted sound (air) detected by the air-conducted sound detector 60a and the vibration sound (vib) detected by the vibration sound detector 55a. In the measurement result screen in FIG. 24, the maximum acoustic gain at 1600 Hz is displayed as a representative value. By thus displaying the air-conducted sound and vibration sound separately, the magnitudes of the transmission efficiency of air-conducted sound and the transmission efficiency of vibration sound can be evaluated. For example, for conductive hearing loss, the degree of performance pertaining to vibration sound is more important. By presenting characteristics pertaining to air-conducted sound and vibration sound separately, the characteristics of the acoustic device 1 pertaining to vibration sound can be evaluated more appropriately.

While air-conducted sound and vibration sound, or combined sound that is a combination thereof, is displayed in the measurement result screen as described above, this example is not limiting. The measurement result screen may be configured to display only one of air-conducted sound and vibration sound. Evaluation software on the PC 500 may function to switch between such displays so as to display only necessary information, while hiding the display of unnecessary information.

While the speakers 91 and 92 are disposed at positions of 0° and 90° in this embodiment, the speakers 91 and 92 may instead be disposed at any other position. For example, the speakers 91 and 92 may be disposed at positions of 180° and 270°. In other words, the speakers 91 and 92 may be disposed at a position with an angle of 0°, 90°, 180°, or 270°, where the front of a virtual human provided with the ear model 50 is at the angle of 0°. In this case, this system stores head-related transfer functions corresponding to the cases of the angle being 0°, 90°, 180°, or 270° in the memory 520 or the like. The test sound provider 700 adjusts the sounds to provide to the speaker 91 and to the speaker 92 with an equalizer (not illustrated) based on the respective head-related transfer functions and then provides the sounds by outputting the adjusted sounds to the speaker 91 and the speaker 92. The directionality of the characteristics of the acoustic device 1 can thus be evaluated.

Embodiment 5

The following describes Embodiment 5. As compared to Embodiment 4, the structure of the measurement system 12 differs in Embodiment 5. The remaining structure is the same as in Embodiment 4. Where the structure is the same as in Embodiment 4, the same reference signs are applied, and a description thereof is omitted.

Figure 25:
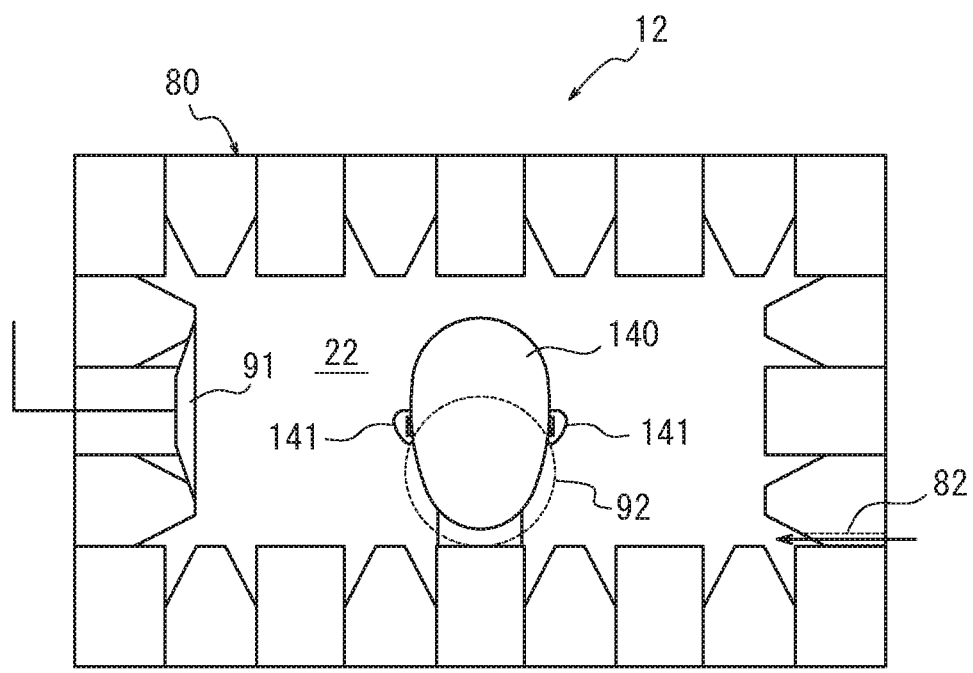
FIG. 25 schematically illustrates the structure of a measurement system according to Embodiment 5.

FIG. 25 schematically illustrates the structure of a measurement system 12 according to Embodiment 5. In the measurement system 12 of this embodiment, the structure of an acoustic device mount 22 differs from that of the acoustic device mount 21 in Embodiment 4, whereas the remaining structure is similar to that of Embodiment 4. Accordingly, the measurement unit 210 in Embodiment 4 is omitted from FIG. 25. The acoustic device mount 22 includes a human head model 140 and a pair of corresponding ear models 141 provided on the left and right. The head model 140 is, for example, ATS, KEMAR, or the like. The ear models 141 of the head model 140 are detachable from the head model 140.

The ear models 141 are modeled after a human ear and each include, like the ear model 50 in Embodiment 4, an artificial auricle 142 and an artificial external ear canal unit 144, joined to the artificial auricle 142, in which an artificial external ear canal 143 is formed, as illustrated by the side view in FIG. 26A of the ear model 141 removed from the head model 140. Like the ear model 50 in Embodiment 4, a vibration sound detector 145 provided with a vibration detection element is disposed at the periphery of the opening in the artificial external ear canal 143 in the artificial external ear canal unit 144. As illustrated by the side view in FIG. 26B with the artificial ear 141 removed, an air-conducted sound detector 146 provided with a microphone is disposed in the central region on the mount for the ear model 141 in the head model 140. The air-conducted sound detector 146 is disposed so as to measure sound pressure of sound propagating through the artificial external ear canal 143 of the ear model 141 once the ear model 141 is mounted on the head model 140. Like the ear model 50 in Embodiment 4, the air-conducted sound detector 146 may be disposed on the ear model 141 side. The vibration detection element 57c with which the vibration sound detector 145 is configured and the microphone 62a with which the air-conducted sound detector 146 is configured are connected to the measurement unit 210 in a similar way as in Embodiment 4.

The measurement system 12 of this embodiment yields measurement results similar to those of the measurement system 11 of Embodiment 4. Among other effects, in this embodiment, the acoustic device 1 is evaluated by detachably mounting the ear models 141 for vibration detection on the human head model 140, thus allowing evaluation that conforms more closely to the actual form of use by taking into consideration the effect of the head.

Embodiment 6

The following describes Embodiment 6. Overall, Embodiment 6 differs from Embodiment 5 in that the human head model 140 rotates.

Figure 27:
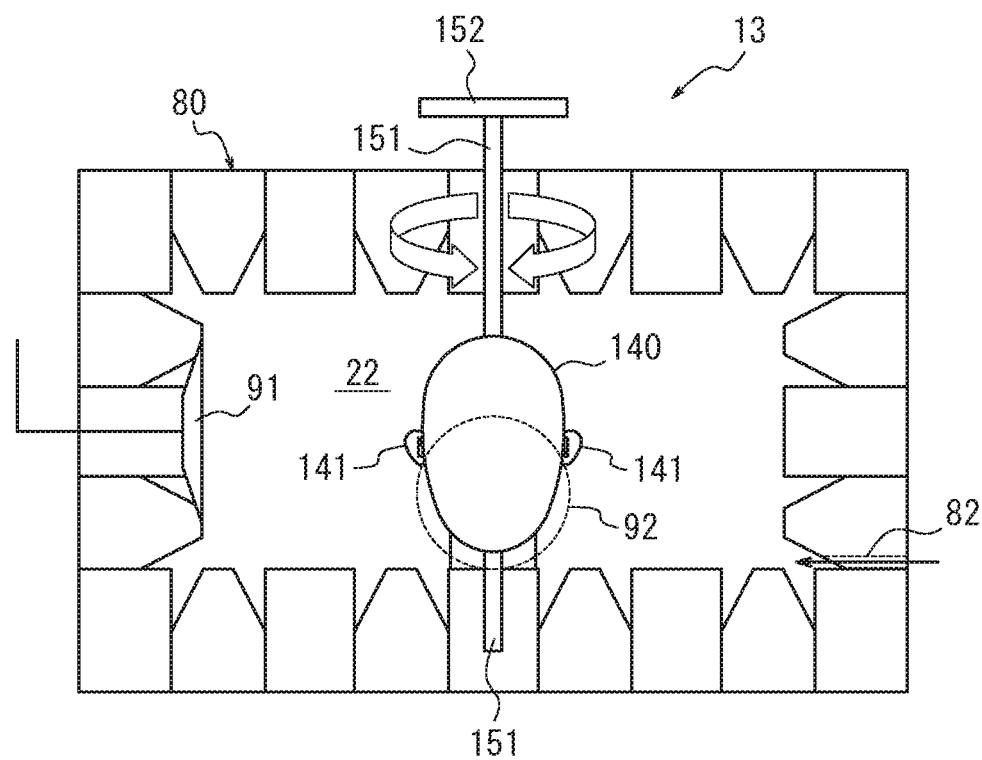
FIG. 27 schematically illustrates the structure of a measurement system according to Embodiment 6.

FIG. 27 schematically illustrates the structure of a measurement system 13 according to Embodiment 6. The measurement system 13 of this embodiment differs from the acoustic device mount 22 in Embodiment 5 in that the human head model 130 rotates, whereas the remaining structure is similar to that of Embodiment 5.

The measurement system 13 of this embodiment includes a rotating shaft 151 and a handle 152 for the rotating shaft 151. The rotating shaft 151 is disposed to pass through the center of the head model 140. The rotating shaft 151 is fixed to the head model 140, so that when the rotating shaft 151 rotates, the head model 140 also rotates about the rotating shaft. The rotating shaft 151 extends to the outside of the anechoic space 80 and is configured to be rotatable from outside the anechoic space 80. So as not to deform easily, the rotating shaft 151 is preferably made of metal, such as SUS, but may be made of resin.

The handle 152 is provided on the end of the rotating shaft 151 that extends out of the anechoic space 80. For visual confirmation of the angle of rotation from 0°, the handle 152 is provided with an angle display (0° to 360°) as on a protractor. When the handle 152 rotates due to being operated by the measurer, the head model 140 rotates as a result of rotation of the rotating shaft 151. By rotating the head model 140, the relative angle between the head model 140 and the speakers 91 and 92 can be changed freely. By emitting sound from the speakers 91 and 92 from any angle, the measurement system of Embodiment 6 can evaluate the directionality of the characteristics of the acoustic device 1 in greater detail.

While the rotating shaft 151 passes through the head model 140 in this embodiment, this example is not limiting. The rotating shaft 151 need not pass through the head model 140 and instead may extend to any location within the head model 140.

The rotating shaft 141 may be hollow. In this case, a signal wire for the vibration sound detector 135, air-conducted sound detector 136, or the like may be housed in the hollow portion.

While the head model 140 is rotated in this embodiment, the speakers 91 and 92 may instead be rotated with respect to the head model 140. In this case as well, the relative angle between the speakers 91 and 92 and the head model 140 can be changed freely, allowing the directionality of the characteristics of the acoustic device 1 to be evaluated in greater detail.

Although this disclosure is based on embodiments and drawings, it is to be noted that various changes and modifications will be apparent to those skilled in the art based on this disclosure. Therefore, such changes and modifications are to be understood as included within the scope of this disclosure. For example, the functions and the like included in the various units, members, and the like may be reordered in any logically consistent way. Furthermore, units and members may be combined into one or divided. Embodiments 1 to 3 are not limited to two vibration pickups. Instead, three or more vibration pickups may be provided on the same vibration transmission member or each on separate vibration transmission members. The output of the plurality of vibration pickups may be combined, and the gain may then be adjusted at each frequency by an equalizer. The vibration pickups may be attached directly around the artificial external ear canal without providing the vibration transmission member therebetween. In Embodiments 4 to 6, the vibration detection element may be disposed on a vibration transmission member, like the vibration pickups in Embodiments 1 to 3. When providing a plurality of vibration detection elements, the output thereof may be combined, and the gain may then be adjusted at each frequency by an equalizer.

In the above embodiments, the measurement unit includes various functional units that execute certain functions. These functional units have been described schematically in order to briefly illustrate the functionality thereof. It should be noted that particular hardware and software is not necessarily indicated. In this sense, it suffices for the functional units and other constituent elements to be hardware and software implemented so as to substantially execute the particular functions described here. The various functions of different constituent elements may be combined with or separated from hardware and software in any way, and each may be used individually or in some combination. In this way, the various subject matter disclosed herein may be embodied in a variety of different forms, and all such embodiments are included in the scope of the subject matter in this disclosure.

REFERENCE SIGNS LIST

1 Acoustic device (hearing aid)
2 Vibrating body
3 Microphone
10 Measurement device
11, 12, 13 Measurement system
21, 22 Acoustic device mount
50 Ear model
51 Artificial ear
51a Artificial auricle
52 Artificial external ear canal unit
53 Artificial external ear canal
55a Vibration sound detector
56 Vibration transmitter
57a, 57b Vibration pickup
57c Vibration detection element
58, 58b, 58c Vibration transmission member
58a Hole
59 Semispherical model
60a Air-conducted sound detector
61 Tube member
62 Microphone
62a Microphone
80 Anechoic space
91, 92 Speaker
100 Electronic device
101 Mobile phone
103 Panel (vibrating body)
110, 130 Hearing aid
111 Vibrating body
140 Head model
141 Ear model
142 Artificial auricle
143 Artificial external ear canal
144 Artificial external ear canal unit
145 Vibration sound detector
146 Air-conducted sound detector
141 Rotating shaft
142 Handle
200, 210 Measurement unit
420 Frequency characteristic adjuster
423 Combining circuit (vibration output combiner)
500 PC
540 Display

The invention claimed is:

1. A measurement device for evaluating an electronic device that causes sound to be heard via vibration transmission by pressing a vibrating body against a human ear, the measurement device comprising:
   an ear model modeled after a human ear, the ear model including an auricle and a tragus; and
   a plurality of vibration pickups disposed at a periphery of an artificial external ear canal formed in the ear model, wherein one of the plurality of vibration pickups is disposed at a position corresponding to the tragus of the ear model, and another vibration pickup is disposed at a position corresponding to the opposite side with the artificial external ear canal.

2. The measurement device of claim 1, wherein
   the ear model comprises an artificial external ear canal unit, an artificial ear joined to the artificial external ear canal unit, and a vibration transmitter joined to the artificial external ear canal unit, and
   the artificial external ear canal is formed in the artificial external ear canal unit, and the plurality of vibration pickups is mounted on the vibration transmitter.

3. The measurement device of claim 2, wherein the vibration transmitter is formed by a vibration transmission member including a hole in communication with the artificial external ear canal.

4. The measurement device of claim 3, wherein the hole has a diameter of 5 mm to 18 mm.

5. The measurement device of claim 4, wherein the vibration transmission member is shaped as a ring with an external diameter that is 6 mm to 12 mm greater than a diameter of the hole.

6. The measurement device of claim 2, wherein the vibration transmitter comprises a plurality of vibration transmission members joined at the periphery of the artificial external ear canal, and one or more of the vibration pickups is mounted on each of the vibration transmission members.

7. The measurement device of claim 1, further comprising a vibration output combiner configured to combine output of the plurality of vibration pickups.

8. The measurement device of claim 7, further comprising:
   a plurality of frequency characteristic adjusters configured to adjust a frequency characteristic of output from each of the plurality of vibration pickups, wherein
   the vibration output combiner combines output of the plurality of frequency characteristic adjusters.

9. The measurement device of claim 1, wherein the ear model further comprises a microphone configured to measure sound pressure of sound propagating through the artificial external ear canal.

10. The measurement device of claim 9, wherein the microphone is held in a tube member extending from an outer wall of the artificial external ear canal.

11. The measurement device of claim 9, wherein the microphone is disposed in a floating state with respect to an outer wall of the artificial external ear canal.

12. The measurement device of claim 1, wherein the artificial external ear canal has a length of 8 mm to 30 mm.

13. The measurement device of claim 1, wherein the ear model includes a portion formed from material conforming to IEC 60318-7.

* * * * *